US011572148B2

(12) United States Patent
Cheng

(10) Patent No.: US 11,572,148 B2
(45) Date of Patent: Feb. 7, 2023

(54) AIRCRAFT STRINGERS HAVING CFRP MATERIAL REINFORCED FLANGES

(71) Applicant: The Boeing Company, Chicago, IL (US)

(72) Inventor: Jiangtian Cheng, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 1284 days.

(21) Appl. No.: 15/997,331

(22) Filed: Jun. 4, 2018

(65) Prior Publication Data

US 2019/0367145 A1  Dec. 5, 2019

(51) Int. Cl.
*B64C 1/06* (2006.01)
*B29C 70/30* (2006.01)
(Continued)

(52) U.S. Cl.
CPC .............. *B64C 1/064* (2013.01); *B29C 70/30* (2013.01); *B64C 3/182* (2013.01);
(Continued)

(58) Field of Classification Search
CPC . B64C 1/064; B64C 3/182; B64C 2001/0072; B64C 1/00; B29C 70/30; B29C 66/524; B29C 66/7212; B29C 65/5057; B29C 66/532; B29C 66/61; B29C 66/73752; B29C 66/1122; B29C 65/5014; B29C 66/721; B29C 65/5071; B29C 65/5042; B29C 66/52441; B29C 66/131; B29C 66/112; B29C 66/636; B29K 2307/04; B29L 2031/3076; B29L 2031/3082; B29L 2031/3085; Y02T 50/40;
(Continued)

(56) References Cited

U.S. PATENT DOCUMENTS 9,463,864 B1 * 10/2016 McCarville ........ B29D 99/0007
9,463,880 B2    10/2016 Vetter et al.
(Continued)

FOREIGN PATENT DOCUMENTS

EP        2764987          9/2016

OTHER PUBLICATIONS

European Patent Office, "Extended European Search Report," issued in connection with European Patent Application No. 19177826.5, dated Oct. 2, 2019, 9 pages.
(Continued)

*Primary Examiner* — Valentina Xavier
(74) *Attorney, Agent, or Firm* — Hanley, Flight & Zimmerman, LLC

(57) ABSTRACT

Aircraft stringers having carbon fiber reinforced plastic (CFRP) material reinforced flanges are disclosed. An example stringer to be coupled to a skin of an aircraft comprises a flange. The flange includes a first portion of a first stiffening segment. The flange further includes a first portion of a second stiffening segment coupled to the first portion of the first stiffening segment. The flange further includes a CFRP reinforcement segment coupled to the first portion of the first stiffening segment and to the first portion of the second stiffening segment. The CFRP reinforcement segment strengthens the first portion of the first stiffening segment and the first portion of the second stiffening segment.

23 Claims, 12 Drawing Sheets

(51) Int. Cl.
  *B64C 3/18*   (2006.01)
  *B29K 307/04* (2006.01)
  *B29L 31/30*  (2006.01)
  *B64C 1/00*   (2006.01)

(52) U.S. Cl.
  CPC ... *B29K 2307/04* (2013.01); *B29L 2031/3076* (2013.01); *B64C 2001/0072* (2013.01)

(58) Field of Classification Search
  CPC .. B32B 27/08; B32B 5/02; B32B 3/02; B32B 1/00; B32B 5/26; B32B 2250/44; B32B 9/007; B29D 99/0014; B64F 5/10
  See application file for complete search history.

(56) References Cited

U.S. PATENT DOCUMENTS

| | | | |
|---|---|---|---|
| 9,856,008 B2* | 1/2018 | Cheng | B64C 1/06 |
| 2011/0220006 A1* | 9/2011 | Kaye | B64C 3/185 |
| | | | 116/201 |
| 2014/0117157 A1 | 5/2014 | Diep et al. | |
| 2016/0159453 A1* | 6/2016 | Korenaga | B64C 1/064 |
| | | | 428/57 |
| 2016/0346995 A1* | 12/2016 | Butler | B29C 66/112 |

OTHER PUBLICATIONS

European Patent Office, "Communication pursuant to Article 94(3) EPC," issued in connection with European Patent Application No. 19177826.5, dated Mar. 15, 2021, 4 pages.

European Patent Office, "Communication under Rule 71(3) EPC," issued in connection with European Patent Application No. 19177826.5, dated Jun. 15, 2022, 8 pages.

* cited by examiner

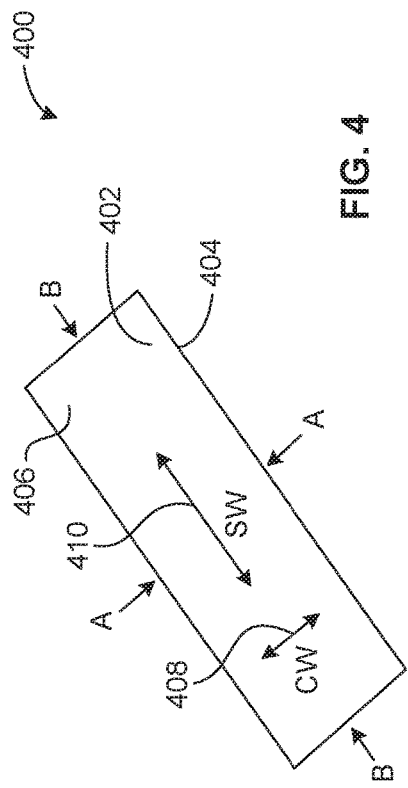
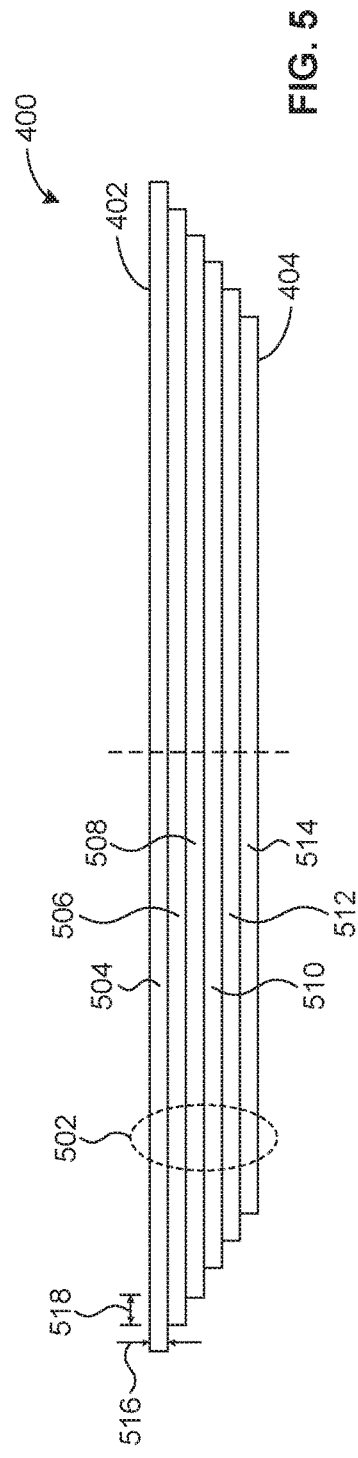
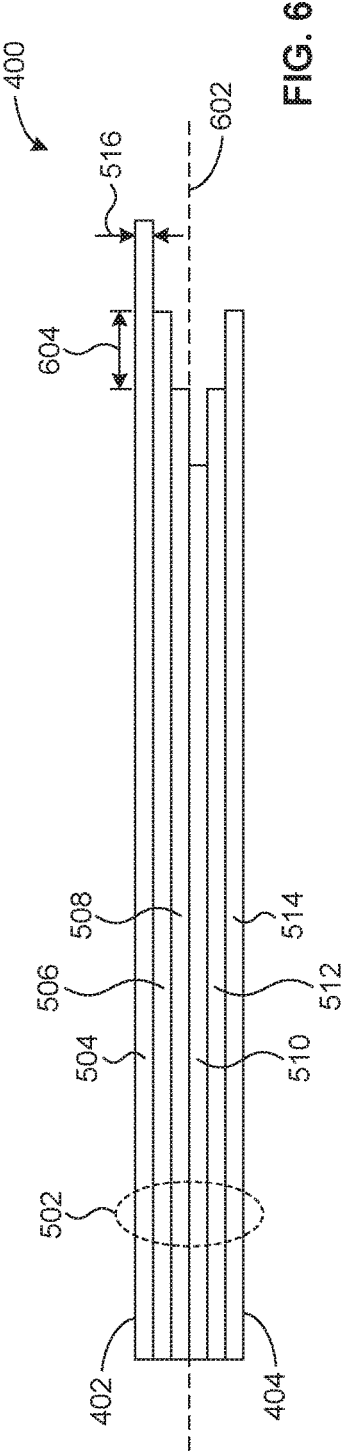

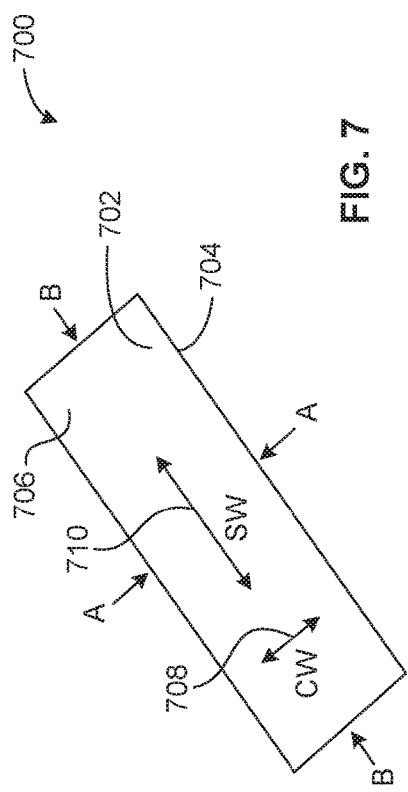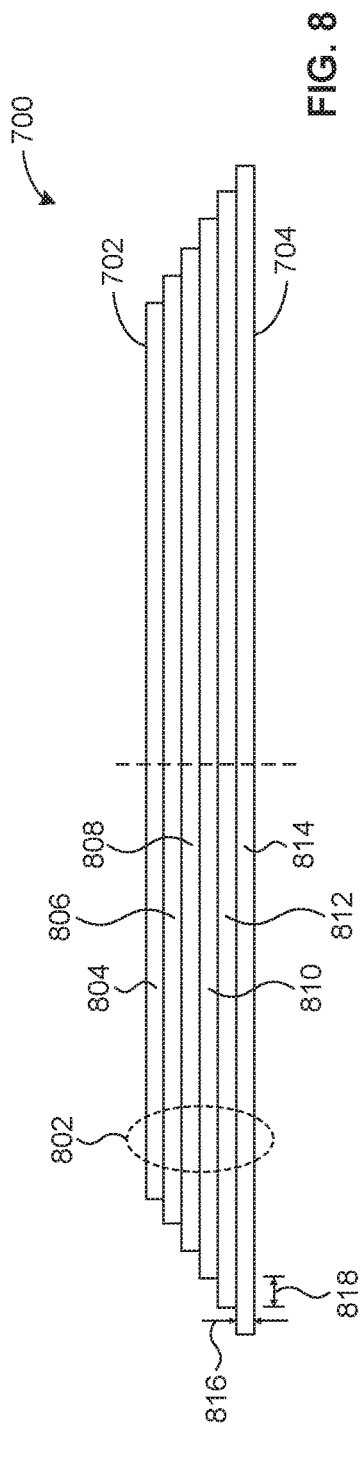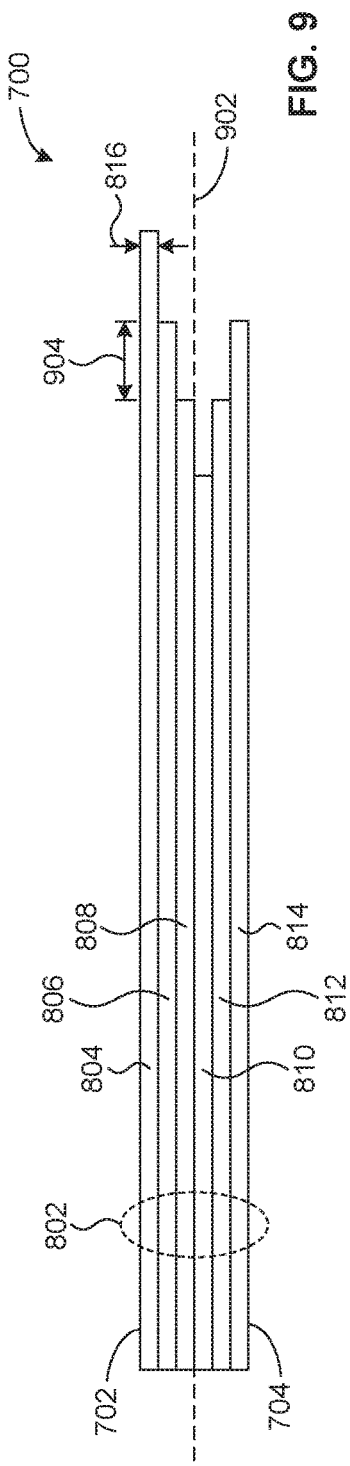

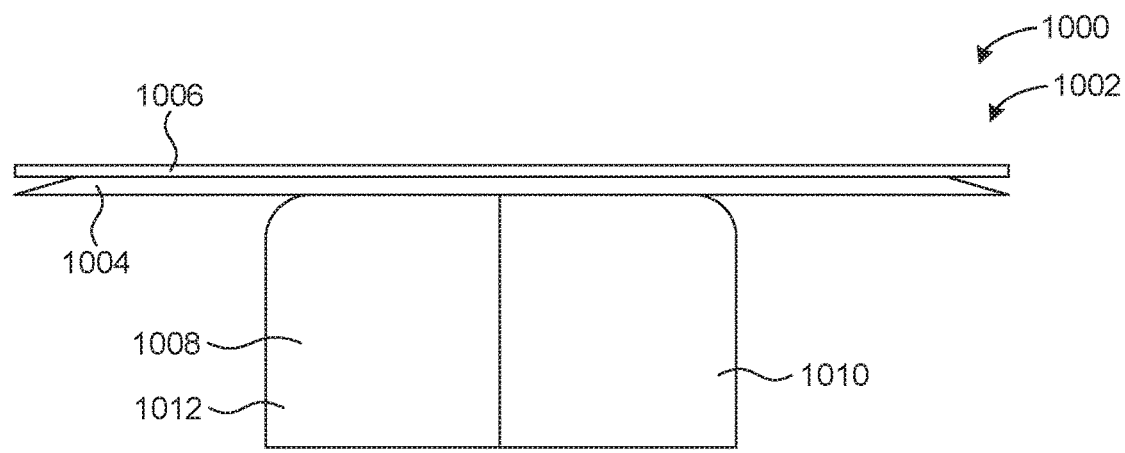
FIG. 10A
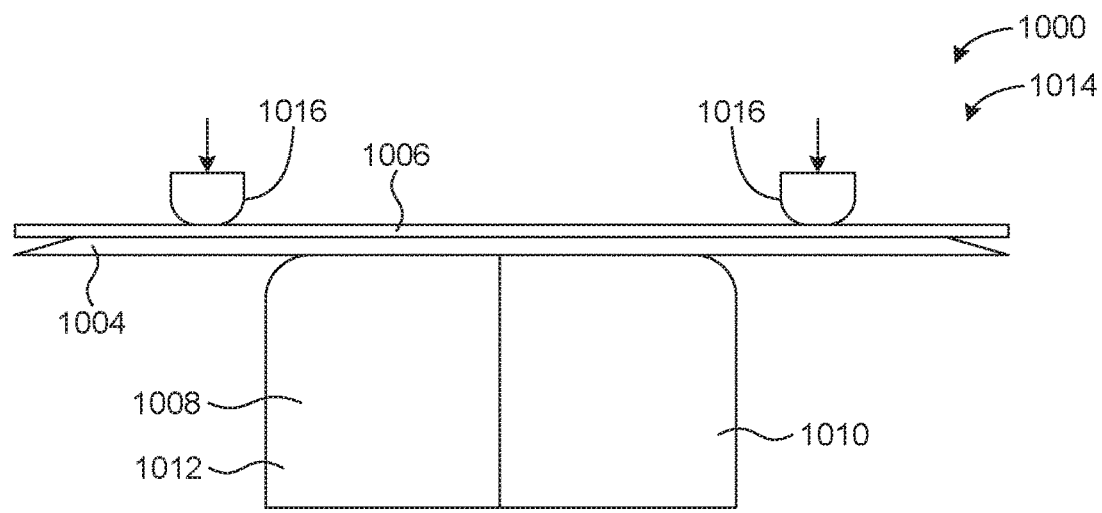
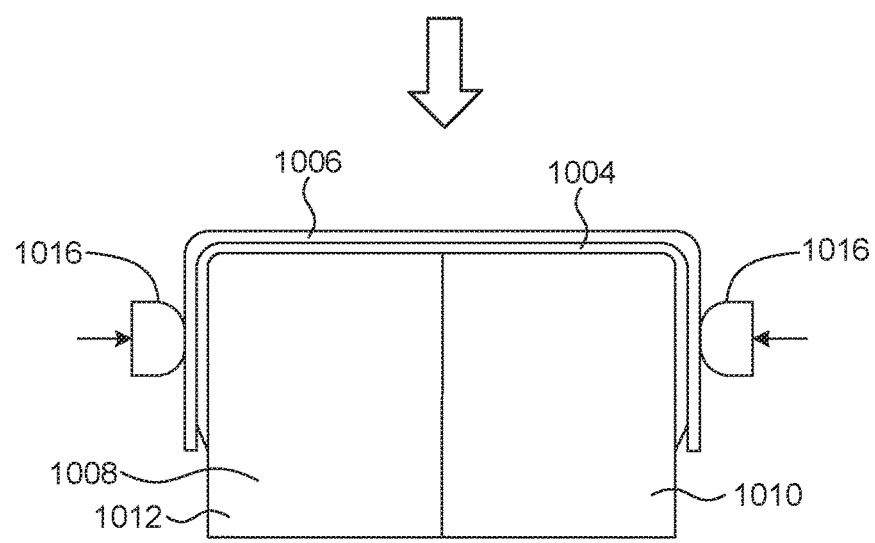
FIG. 10B

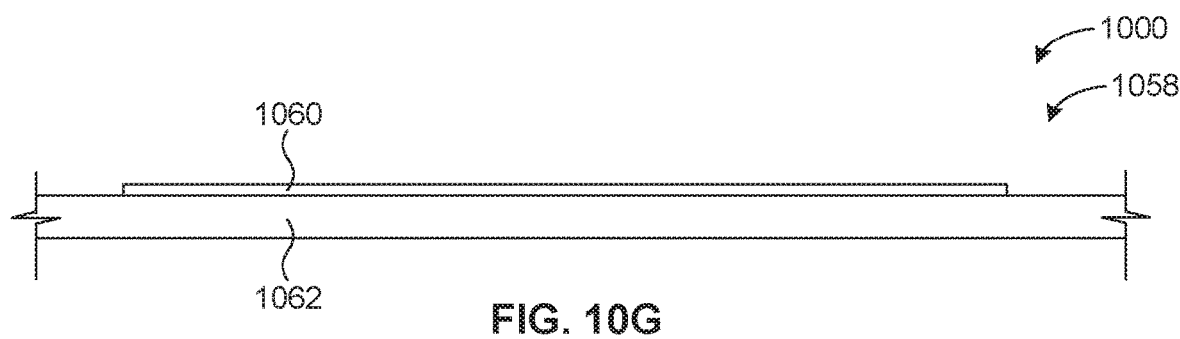
FIG. 10G
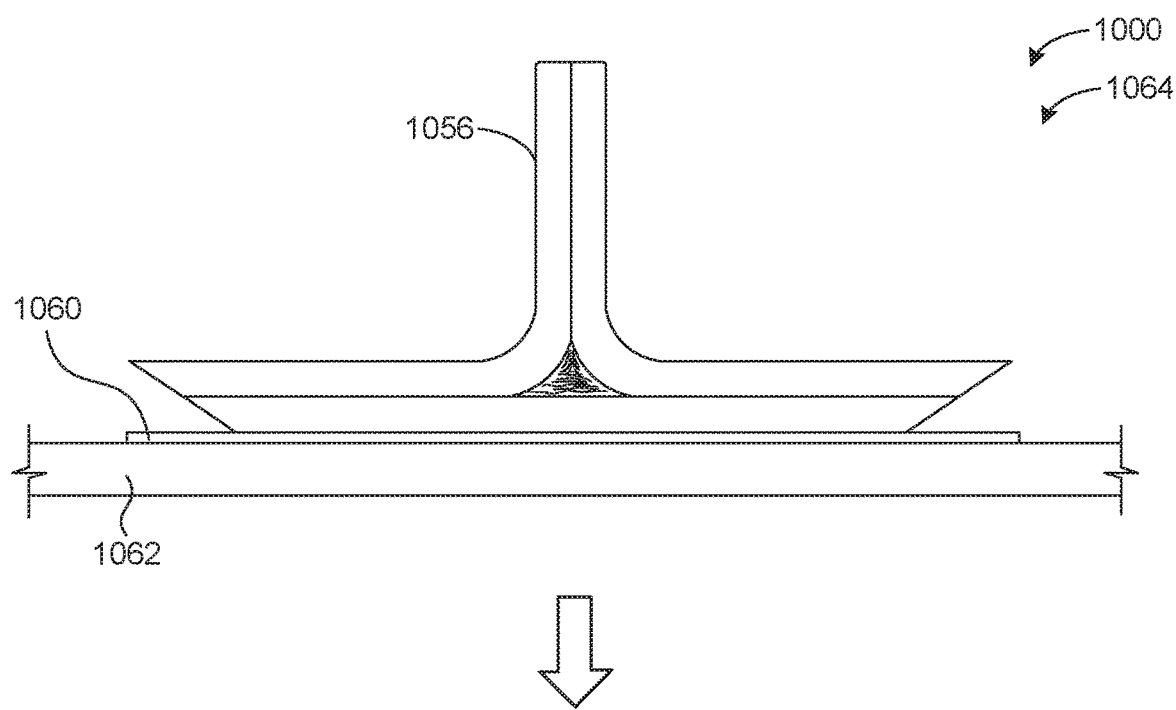
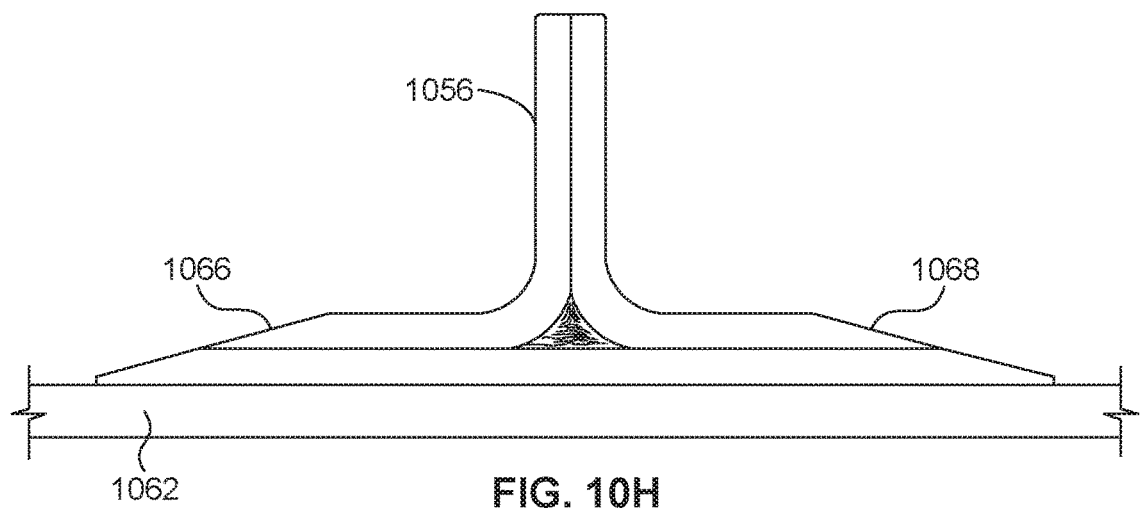
FIG. 10H

AIRCRAFT STRINGERS HAVING CFRP MATERIAL REINFORCED FLANGES

FIELD OF THE DISCLOSURE

This disclosure relates generally to stringers implemented in aircraft and, more specifically, to aircraft stringers having carbon fiber reinforced plastic (CFRP) material reinforced flanges.

BACKGROUND

Fuselages and wings of aircraft can include structural stiffeners, such as stringers, to help the fuselage and wings maintain their shape under various stress and strain conditions. The size, shape, and/or configuration of a stringer can impact one or more performance attribute(s) associated with the stringer. For example, the size, shape, and/or configuration of a stringer coupled to a composite structure of an aircraft such as a skin of a fuselage or wing can affect the impact strength, the crippling strength, and/or the buckling strength associated with the stringer. The size, shape, and/or configuration of the stringer can also affect the potential for thermal cracking and/or wrinkle formation within the stringer.

SUMMARY

Aircraft stringers having CFRP material reinforced flanges are disclosed. A stringer to be coupled to a skin of an aircraft is disclosed. The stringer comprises a flange. The flange includes a first portion of a first stiffening segment. The flange also includes a first portion of a second stiffening segment coupled to the first portion of the first stiffening segment. The flange also includes a CFRP reinforcement segment coupled to the first portion of the first stiffening segment and to the first portion of the second stiffening segment. The CFRP reinforcement segment is to strengthen the first portion of the first stiffening segment and the first portion of the second stiffening segment.

A method of manufacturing a stringer for an aircraft is disclosed. The method comprises forming first and second stiffening segments from a first composite blank. The method further comprises coupling a first portion of the first stiffening segment to a first portion of the second stiffening segment. The method further comprises forming a CFRP reinforcement segment from a second composite blank. The method further comprises coupling the CFRP reinforcement segment to the first portion of the first stiffening segment and to the first portion of the second stiffening segment. The CFRP reinforcement segment is to strengthen the first portion of the first stiffening segment and the first portion of the second stiffening segment.

BRIEF DESCRIPTION OF THE DRAWINGS

FIG. 4 is a perspective view of a composite blank from which the reinforcement segment of the stringer of FIG. 3 can be fabricated.

FIG. 5 is an enlarged cross-sectional view of the composite blank of FIG. 4 taken along line A-A of FIG. 4.

FIG. 6 is an enlarged cross-sectional view of the composite blank of FIG. 4 taken along line B-B of FIG. 4.

FIG. 7 is a perspective view of a composite blank from which the first and second stiffening segments, or the base segment of the stringer of FIG. 3 can be fabricated.

FIG. 8 is an enlarged cross-sectional view of the composite blank of FIG. 7 taken along line A-A of FIG. 7.

FIG. 9 is an enlarged cross-sectional view of the composite blank of FIG. 7 taken along line B-B of FIG. 7.

FIGS. 10A-10K illustrate a process used to manufacture the stringer of FIG. 3.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Figure 1:
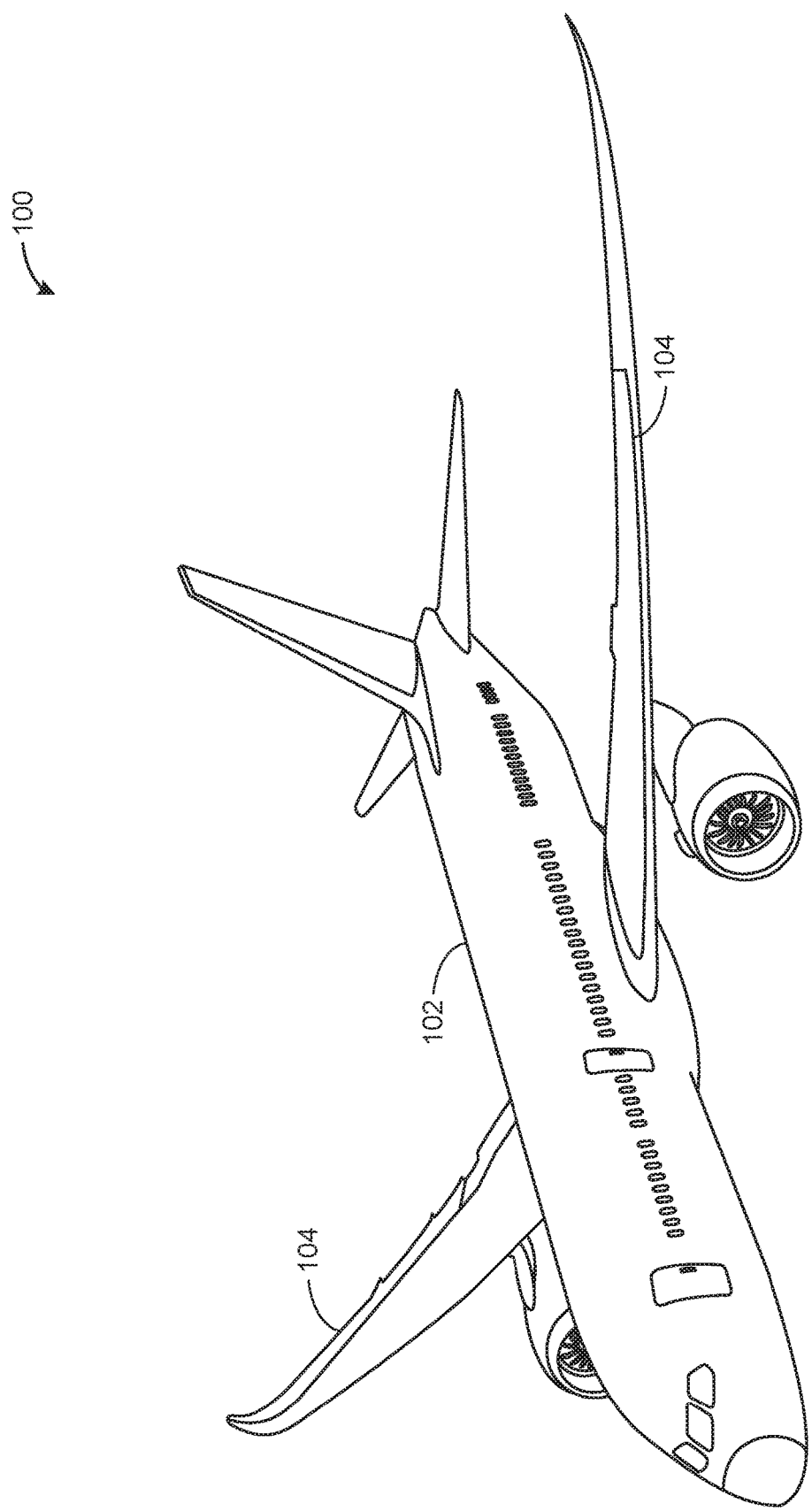
FIG. 1 illustrates an aircraft in which one or more stringer(s) can be implemented.

As discussed above, fuselages and wings of aircraft can include stringers to help the fuselage and wings maintain their shape under various stress and strain conditions. FIG. 1 illustrates an aircraft 100 in which one or more stringer(s) can be implemented. The aircraft 100 of FIG. 1 includes a fuselage 102, which can enclose a passenger cabin and/or a cargo area. The fuselage 102 can include a skin and stringers coupled to the skin. The stringers provide structural support to the skin of the fuselage 102. The fuselage 102 can be a multiply composite fuselage 102 such as a CFRP fuselage. Alternatively, the fuselage 102 can be made of a different type of material.

The aircraft 100 of FIG. 1 further includes wings 104 (e.g., a right wing and a left wing) extending laterally outward from the fuselage 102. The wings 104 can also include stringers to provide structural support to a skin of the wings 104. The wings 104 can be made of substantially the same composite material as the composite fuselage 102. Alternatively, the wings 104 can be made of a different type of material.

The size, shape, and/or configuration of a stringer coupled to the skin of the fuselage 102 or to the skin of one of the wings 104 of the aircraft 100 of FIG. 1 can impact one or more performance attribute(s) associated with the stringer. For example, the size, shape, and/or configuration of the stringer can affect the impact strength, the crippling strength, and/or the buckling strength associated with the stringer. The size, shape, and/or configuration of the stringer can also affect the potential for thermal cracking and/or wrinkle formation within the stringer.

Figure 2:
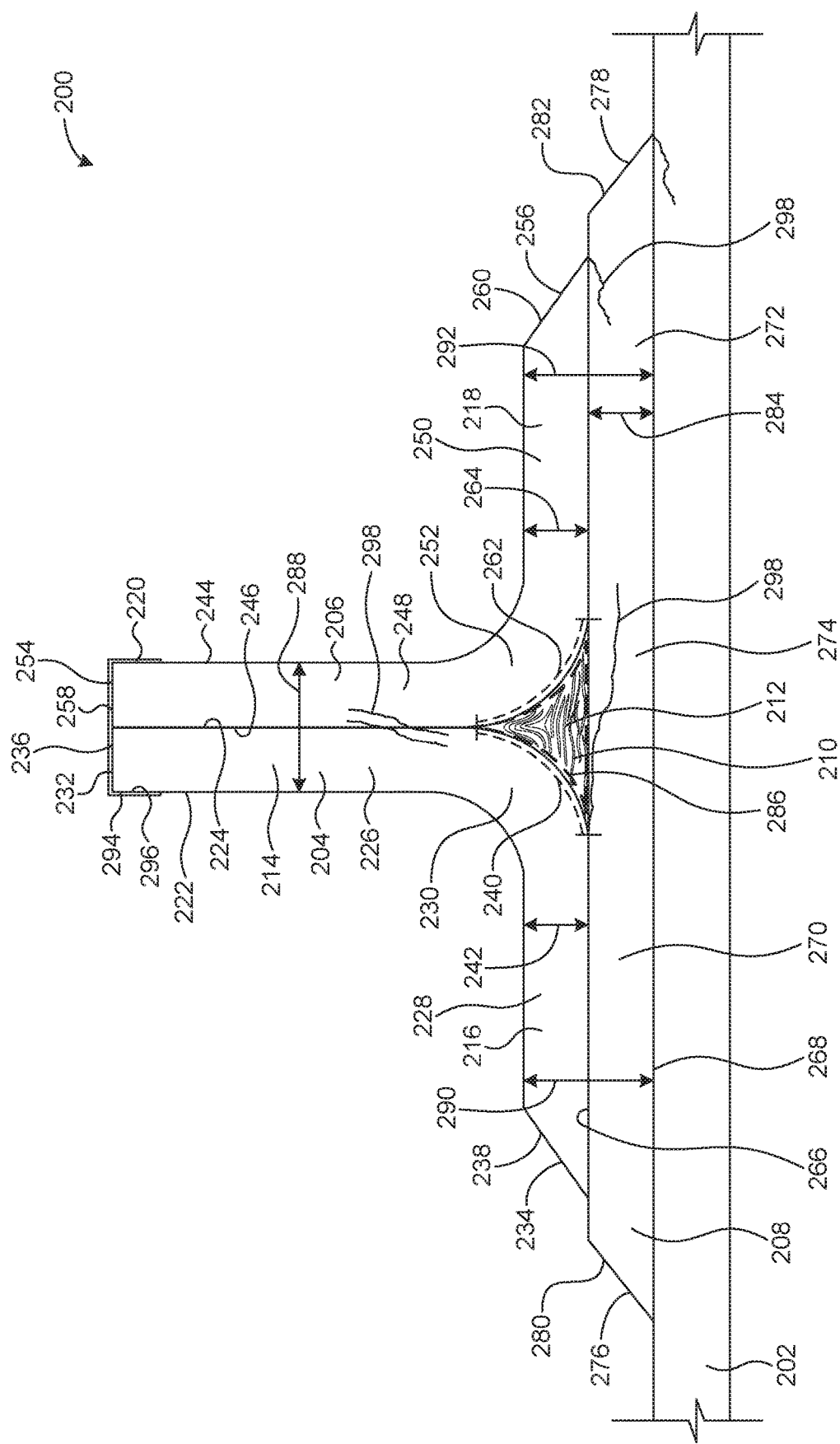
FIG. 2 illustrates a known stringer.

Before describing the details of the disclosed stringers having CFRP material reinforced flanges, a description of a known stringer is provided herein for context. FIG. 2 illustrates a known stringer 200. The stringer 200 of FIG. 2 is coupled (e.g., joined, bonded, adhered, etc.) to a skin 202 of an aircraft (e.g., a skin of the aircraft 100 of FIG. 1). The stringer 200 includes a first stiffening segment 204, a second stiffening segment 206, a base segment 208, a filler area 210, a filler 212, a first flange 214, a second flange 216, a third flange 218, and an end cap 220.

The first stiffening segment 204 of the stringer 200 of FIG. 2 includes a first surface 222 and a second surface 224 located opposite the first surface 222. The first surface 222 of the first stiffening segment 204 faces and/or is oriented away from the second stiffening segment 206 and/or the base segment 208 of the stringer 200. The second surface 224 of the first stiffening segment 204 faces and/or is oriented toward the second stiffening segment 206 and/or the base segment 208 of the stringer 200. The first stiffening segment 204 includes and/or is formed from multiple plies of material sandwiched between the first and second surfaces 222, 224 of the first stiffening segment 204.

The first stiffening segment 204 of FIG. 2 further includes a first portion 226, a second portion 228 oriented at an angle to the first portion 226 of the first stiffening segment 204, and a third portion 230 extending between the first portion 226 and the second portion 228 of the first stiffening segment 204. The second portion 228 of the first stiffening segment 204 is substantially perpendicular to the first portion 226 of the first stiffening segment 204. Based on the orientation of the stringer 200 illustrated in FIG. 2, the first portion 226 of the first stiffening segment 204 is oriented vertically, and the second portion 228 of the first stiffening segment 204 is oriented horizontally. The first and second portions 226, 228 of the first stiffening segment 204 are substantially linear, and the third portion 230 of the first stiffening segment 204 is curved and/or non-linear.

The first stiffening segment 204 of FIG. 2 further includes a first end 232 formed by the first portion 226 of the first stiffening segment 204, and a second end 234 formed by the second portion 228 of the first stiffening segment 204. The first end 232 of the first stiffening segment 204 has a flat edge 236 (e.g., a zero-degree chamfered edge) extending between the first and second surfaces 222, 224 of the first stiffening segment 204. The second end 234 of the first stiffening segment 204 has an angled edge 238 (e.g., a forty-five-degree chamfered edge) extending between the first and second surfaces 222, 224 of the first stiffening segment 204.

The third portion 230 of the first stiffening segment 204 has a curvature defined by a radius of curvature 240 measured along the second surface 224 of the first stiffening segment 204 over the span of the third portion 230. The first stiffening segment 204 has a thickness 242 measured between the first and second surfaces 222, 224 of the first stiffening segment 204. The thickness 242 of the first stiffening segment 204 is substantially constant and/or uniform among and/or over the first, second and third portions 226, 228, 230 of the first stiffening segment 204. The radius of curvature 240 of the first stiffening segment 204 of FIG. 2 is approximately twelve millimeters (12 mm). The thickness 242 of the first stiffening segment 204 of FIG. 2 is approximately six millimeters (6 mm).

The second stiffening segment 206 of the stringer 200 of FIG. 2 is constructed and/or implemented as a mirror image of the first stiffening segment 204 of the stringer 200. The second stiffening segment 206 of FIG. 2 includes a first surface 244 and a second surface 246 located opposite the first surface 244. The first surface 244 of the second stiffening segment 206 faces and/or is oriented away from the first stiffening segment 204 and/or the base segment 208 of the stringer 200. The second surface 246 of the second stiffening segment 206 faces and/or is oriented toward the first stiffening segment 204 and/or the base segment 208 of the stringer 200. The second stiffening segment 206 includes and/or is formed from multiple plies of material sandwiched between the first and second surfaces 244, 246 of the second stiffening segment 206.

The second stiffening segment 206 of FIG. 2 further includes a first portion 248, a second portion 250 oriented at an angle to the first portion 248 of the second stiffening segment 206, and a third portion 252 extending between the first portion 248 and the second portion 250 of the second stiffening segment 206. The second portion 250 of the second stiffening segment 206 is substantially perpendicular to the first portion 248 of the second stiffening segment 206. Based on the orientation of the stringer 200 illustrated in FIG. 2, the first portion 248 of the second stiffening segment 206 is oriented vertically, and the second portion 250 of the second stiffening segment 206 is oriented horizontally. The first and second portions 248, 250 of the second stiffening segment 206 are substantially linear, and the third portion 252 of the second stiffening segment 206 is curved and/or non-linear.

The second stiffening segment 206 of FIG. 2 further includes a first end 254 formed by the first portion 248 of the second stiffening segment 206, and a second end 256 formed by the second portion 250 of the second stiffening segment 206. The first end 254 of the second stiffening segment 206 has a flat edge 258 (e.g., a zero-degree chamfered edge) extending between the first and second surfaces 244, 246 of the second stiffening segment 206. The second end 256 of the second stiffening segment 206 has an angled edge 260 (e.g., a forty-five-degree chamfered edge) extending between the first and second surfaces 244, 246 of the second stiffening segment 206.

The third portion 252 of the second stiffening segment 206 has a curvature defined by a radius of curvature 262 measured along the second surface 246 of the second stiffening segment 206 over the span of the third portion 252. The second stiffening segment 206 has a thickness 264 measured between the first and second surfaces 244, 246 of the second stiffening segment 206. The thickness 264 of the second stiffening segment 206 is substantially constant and/or uniform among and/or over the first, second and third portions 248, 250, 252 of the second stiffening segment 206. The radius of curvature 262 of the second stiffening segment 206 of FIG. 2 is approximately twelve millimeters (12 mm). The thickness 264 of the second stiffening segment 206 of FIG. 2 is approximately six millimeters (6 mm). Thus, the radius of curvature 262 and the thickness 264 of the second stiffening segment 206 of FIG. 2 are equal to corresponding ones of the radius of curvature 240 and the thickness 242 of the first stiffening segment 204 of FIG. 2 described above.

The base segment 208 of the stringer 200 of FIG. 2 includes a first surface 266 and a second surface 268 located opposite the first surface 266. The first surface 266 of the base segment 208 faces and/or is oriented toward the first stiffening segment 204 and/or the second stiffening segment 206 of the stringer 200. The second surface 268 of the base segment 208 faces and/or is oriented away from the first stiffening segment 204 and/or the second stiffening segment 206 of the stringer 200. The base segment 208 includes and/or is formed from multiple plies of material sandwiched between the first and second surfaces 266, 268 of the base segment 208.

The base segment 208 of FIG. 2 further includes a first portion 270, a second portion 272 located opposite the first portion 270 of the base segment 208, and a third portion 274 extending between the first portion 270 and the second portion 272 of the base segment 208.

The first, second and third portions 270, 272, 274 of the base segment 208 are aligned and/or are substantially parallel to one another. Based on the orientation of the stringer 200 illustrated in FIG. 2, each of the first, second and third portions 270, 272, 274 of the base segment 208 is oriented horizontally.

The base segment 208 of FIG. 2 further includes a first end 276 formed by the first portion 270 of the base segment 208, and a second end 278 formed by the second portion 272 of the base segment 208. The first end 276 of the base segment 208 has an angled edge 280 (e.g., a forty-five-degree chamfered edge) extending between the first and second surfaces 266, 268 of the base segment 208. The second end 278 of the base segment 208 also has an angled edge 282 (e.g., a forty-five-degree chamfered edge) extending between the first and second surfaces 266, 268 of the base segment 208.

The base segment 208 has a thickness 284 measured between the first and second surfaces 266, 268 of the base segment 208. The thickness 284 of the base segment 208 is substantially constant and/or uniform among and/or over the first, second and third portions 270, 272, 274 of the base segment 208. The thickness 284 of the base segment 208 of FIG. 2 is approximately six millimeters (6 mm). Thus, the thickness 284 of the base segment 208 is equal to corresponding ones of the thickness 242 of the first stiffening segment 204 and the thickness 264 of the second stiffening segment 206 of FIG. 2 described above.

The filler area 210 of the stringer 200 of FIG. 2 includes a cross-sectional area 286 that is generally defined and/or bounded by the third portion 230 of the first stiffening segment 204, the third portion 252 of the second stiffening segment 206, and the third portion 274 of the base segment 208 of FIG. 2 described above. The filler 212 is located within the filler area 210 and is retained therein. The cross-sectional area 286 of the filler area 210 and/or the filler 212 of FIG. 2 is approximately sixty-two square millimeters (62 mm$^2$).

The first portion 248 of the second stiffening segment 206 of FIG. 2 is coupled (e.g., joined, bonded, adhered, etc.) to the first portion 226 of the first stiffening segment 204 of FIG. 2 described above. More specifically, the second surface 246 of the second stiffening segment 206 over the span of the first portion 248 of the second stiffening segment 206 of FIG. 2 is coupled to the second surface 224 of the first stiffening segment 204 over the span of the first portion 226 of the first stiffening segment 204 of FIG. 2.

The first portion 270 of the base segment 208 of FIG. 2 is coupled (e.g., joined, bonded, adhered, etc.) to the second portion 228 of the first stiffening segment 204 of FIG. 2 described above. More specifically, the first surface 266 of the base segment 208 along the span of the first portion 270 of the base segment 208 of FIG. 2 is coupled to the second surface 224 of the first stiffening segment 204 over the span of the second portion 228 of the first stiffening segment 204 of FIG. 2.

The second portion 272 of the base segment 208 of FIG. 2 is coupled (e.g., joined, bonded, adhered, etc.) to the second portion 250 of the second stiffening segment 206 of FIG. 2 described above. More specifically, the first surface 266 of the base segment 208 along the span of the second portion 272 of the base segment 208 of FIG. 2 is coupled to the second surface 246 of the second stiffening segment 206 along the span of the second portion 250 of the second stiffening segment 206 of FIG. 2.

The first, second and third portions 270, 272, 274 of the base segment 208 of FIG. 2 are coupled (e.g., joined, bonded, adhered, etc.) to the skin 202 of FIG. 2 described above. More specifically, the second surface 268 of the base segment 208 along the span of the first, second and third portions 270, 272, 274 of the base segment 208 of FIG. 2 is coupled to the skin 202 along a corresponding span of the skin 202 of FIG. 2.

The first flange 214 of the stringer 200 of FIG. 2 includes and/or is formed by the first portion 226 of the first stiffening segment 204 and the first portion 248 of the second stiffening segment 206 of FIG. 2. The second flange 216 of the stringer 200 of FIG. 2 includes and/or is formed by the second portion 228 of the first stiffening segment 204 and the first portion 270 of the base segment 208 of FIG. 2. The third flange 218 of the stringer 200 of FIG. 2 includes and/or is formed by the second portion 250 of the second stiffening segment 206 and the second portion 272 of the base segment 208 of FIG. 2. The first flange 214 is substantially perpendicular to the second and third flanges 216, 218. The second and third flanges 216, 218 are aligned and/or are substantially parallel to one another. Based on the orientation of the stringer 200 illustrated in FIG. 2, the first flange 214 is oriented vertically, and the second and third flanges 216, 218 are oriented horizontally.

The first flange 214 of FIG. 2 has a thickness 288 that is equal to the sum of the thickness 242 of the first stiffening segment 204 and the thickness 264 of the second stiffening segment 206 of FIG. 2. The thickness 288 of the first flange 214 of FIG. 2 is accordingly approximately twelve millimeters (12 mm). The second flange 216 of FIG. 2 has a thickness 290 that is equal to the sum of the thickness 242 of the first stiffening segment 204 and the thickness 284 of the base segment 208 of FIG. 2. The thickness 290 of the second flange 216 of FIG. 2 is accordingly approximately twelve millimeters (12 mm). The third flange 218 of FIG. 2 has a thickness 292 that is equal to the sum of the thickness 264 of the second stiffening segment 206 and the thickness 284 of the base segment 208 of FIG. 2. The thickness 292 of the third flange 218 of FIG. 2 is accordingly approximately twelve millimeters (12 mm). Thus, the respective thicknesses 288, 290, 292 of corresponding ones of the first, second and third flanges 214, 216, 218 of the stringer 200 of FIG. 2 are equal.

The end cap 220 of the stringer 200 of FIG. 2. includes a first surface 294 and a second surface 296 located opposite the first surface 294. The first surface 294 of the end cap 220 faces and/or is oriented away from the first flange 214 of the stringer 200. More specifically, the first surface 294 of the end cap 220 of FIG. 2 faces and/or is oriented away from the first portion 226 of the first stiffening segment 204 of FIG. 2, and away from the first portion 248 of the second stiffening segment 206 of FIG. 2. The second surface 296 of the end cap 220 faces and/or is oriented toward the first flange 214 of the stringer 200. More specifically, the second surface 296 of the end cap 220 of FIG. 2 faces and/or is oriented toward the first portion 226 of the first stiffening segment 204 of FIG. 2, and toward the first portion 248 of the second stiffening segment 206 of FIG. 2.

The end cap 220 of FIG. 2 includes and/or is formed mostly by a single ply of fiberglass material. The end cap 220 is removably positioned on and/or over an end portion of the first flange 214 of FIG. 2 (e.g., an end portion defined by the first end 232 of the first stiffening segment 204 of FIG. 2 and the first end 254 of the second stiffening segment 206 of FIG. 2). When positioned on and/or over the end portion of the first flange 214 as shown in FIG. 2, the end cap 220 functions as an indicator with respect to low energy impact damage that can be incurred by the first flange 214. The end cap 220 does not structurally strengthen and/or reinforce the first flange 214.

Wrinkles can form and/or develop in the stringer 200 of FIG. 2 during formation and curing of the stringer 200. For example, as shown in FIG. 2, wrinkles 298 can form and/or develop at various locations within and/or between any of the first stiffening segment 204, the second stiffening segment 206, the base segment 208, the first flange 214, the second flange 216, and/or the third flange 218 of the stringer 200. The formation of such wrinkles 298 can be attributable to the design and/or configuration of the stringer 200 of FIG. 2 as described above. For example, the formation of such wrinkles 298 can be attributable to the size of the cross-sectional area 286 of the filler area 210 of the stringer 200. The presence of wrinkles 298 within the stringer 200 of FIG. 2 can negatively impact one or more performance characteristic(s) (e.g., impact strength, crippling strength, buckling strength, etc.) of the stringer 200.

Figure 3:
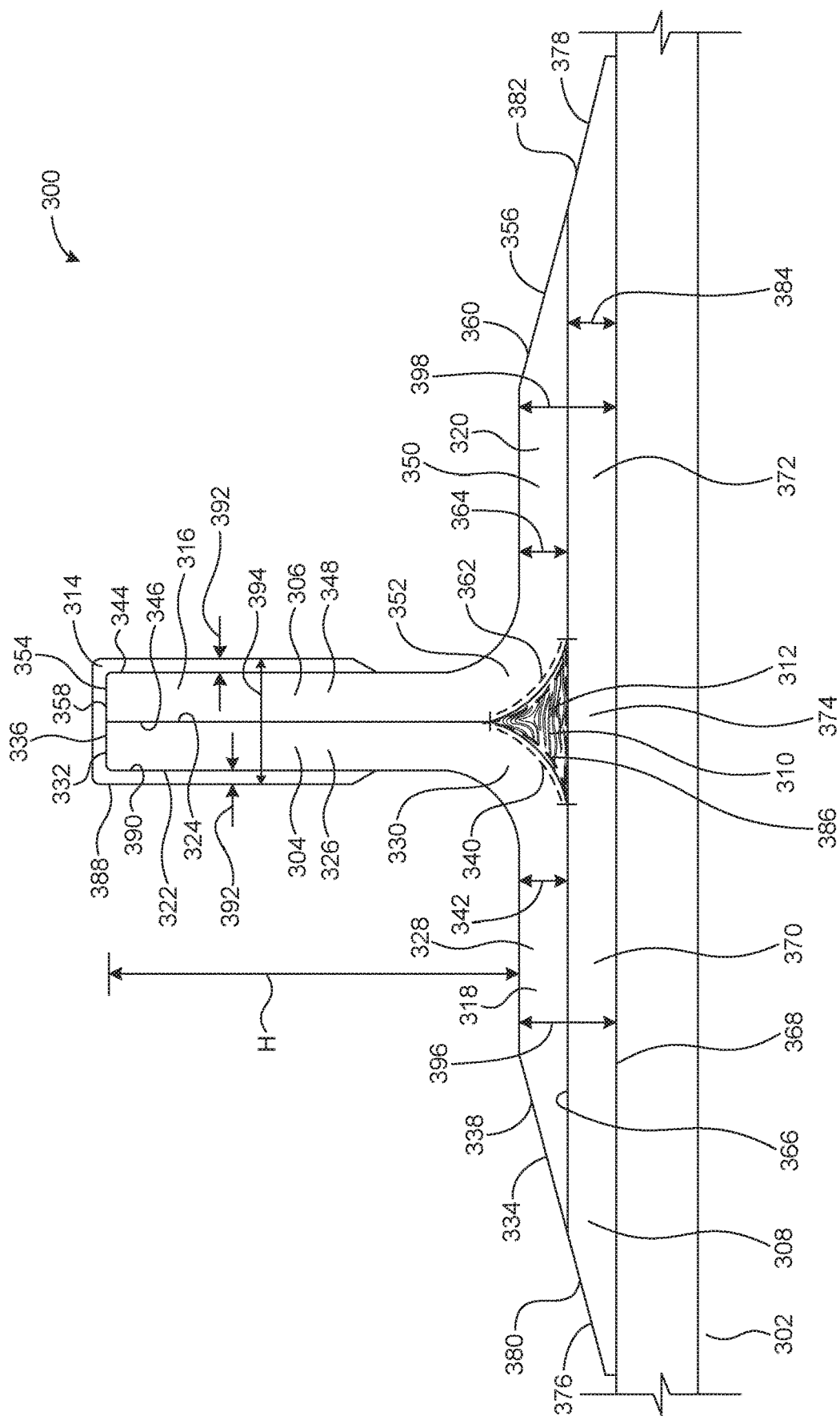
FIG. 3 illustrates a stringer constructed in accordance with the teachings of this disclosure.

FIG. 3 illustrates a stringer 300 constructed in accordance with the teachings of this disclosure. The stringer 300 of FIG. 3 is coupled (e.g., joined, bonded, adhered, etc.) to a skin 302 of an aircraft (e.g., a skin of the aircraft 100 of FIG. 1). The stringer 300 includes a first stiffening segment 304, a second stiffening segment 306, a base segment 308, a filler area 310, a filler 312, a reinforcement segment 314, a first flange 316, a second flange 318, and a third flange 320.

The first stiffening segment 304 of the stringer 300 of FIG. 3 includes a first surface 322 and a second surface 324 located opposite the first surface 322. The first surface 322 of the first stiffening segment 304 faces and/or is oriented away from the second stiffening segment 306 and/or the base segment 308 of the stringer 300. The second surface 324 of the first stiffening segment 304 faces and/or is oriented toward the second stiffening segment 306 and/or the base segment 308 of the stringer 300. The first stiffening segment 304 includes and/or is formed from multiple plies of material sandwiched between the first and second surfaces 322, 324 of the first stiffening segment 304. For example, the first stiffening segment 304 can be formed by separate plies of CFRP material that are stacked and/or laid up relative to one another.

The first stiffening segment 304 of FIG. 2 further includes a first portion 326, a second portion 328 oriented at an angle to the first portion 326 of the first stiffening segment 304, and a third portion 330 extending between the first portion 326 and the second portion 328 of the first stiffening segment 304. The second portion 328 of the first stiffening segment 304 is substantially perpendicular to the first portion 326 of the first stiffening segment 304. Based on the orientation of the stringer 300 illustrated in FIG. 3, the first portion 326 of the first stiffening segment 304 is oriented vertically, and the second portion 328 of the first stiffening segment 304 is oriented horizontally. The first and second portions 326, 328 of the first stiffening segment 304 are substantially linear, and the third portion 330 of the first stiffening segment 304 is curved and/or non-linear.

The first stiffening segment 304 of FIG. 3 further includes a first end 332 formed by the first portion 326 of the first stiffening segment 304, and a second end 334 formed by the second portion 328 of the first stiffening segment 304. The first end 332 of the first stiffening segment 304 has a flat edge 336 (e.g., a zero-degree chamfered edge) extending between the first and second surfaces 322, 324 of the first stiffening segment 304. The flat edge 336 of the first end 332 of the first stiffening segment 304 reduces the difficulty associated with coupling the reinforcement segment 314 to the first stiffening segment 304, as further described below. The second end 334 of the first stiffening segment 304 has an angled edge 338 (e.g., a chamfered edge) extending between the first and second surfaces 322, 324 of the first stiffening segment 304. The angled edge 338 of the second end 334 of the first stiffening segment 304 can be implemented as a chamfered edge having a chamfer angle of between twelve and eighteen degrees relative to the first surface 322 of the first stiffening segment 304 along the second portion 328 of the first stiffening segment 304. Implementation of the angled edge 338 as a chamfered edge having a chamfer angle of between twelve and eighteen degrees reduces (e.g., prevents) delamination.

The third portion 330 of the first stiffening segment 304 has a curvature defined by a radius of curvature 340 measured along the second surface 324 of the first stiffening segment 304 over the span of the third portion 330. The first stiffening segment 304 has a thickness 342 measured between the first and second surfaces 322, 324 of the first stiffening segment 304. The thickness 342 of the first stiffening segment 304 is substantially constant and/or uniform among and/or over the first, second and third portions 326, 328, 330 of the first stiffening segment 304. The constant and/or uniform thickness of the first stiffening segment 304 provides for a part that is relatively easy to form and/or manufacture. The radius of curvature 340 of the first stiffening segment 304 of FIG. 3 is approximately ten millimeters (10 mm) in the illustrated example. The thickness 342 of the first stiffening segment 304 of FIG. 3 is approximately four millimeters (4 mm) in the illustrated example.

The second stiffening segment 306 of the stringer 300 of FIG. 3 is constructed and/or implemented as a mirror image of the first stiffening segment 304 of the stringer 300. The second stiffening segment 306 of FIG. 3 includes a first surface 344 and a second surface 346 located opposite the first surface 344. The first surface 344 of the second stiffening segment 306 faces and/or is oriented away from the first stiffening segment 304 and/or the base segment 308 of the stringer 300. The second surface 346 of the second stiffening segment 306 faces and/or is oriented toward the first stiffening segment 304 and/or the base segment 308 of the stringer 300. The second stiffening segment 306 includes and/or is formed from multiple plies of material sandwiched between the first and second surfaces 344, 346 of the second stiffening segment 306. For example, the second stiffening segment 306 can be formed by separate plies of CFRP material that are stacked and/or laid up relative to one another.

The second stiffening segment 306 of FIG. 3 further includes a first portion 348, a second portion 350 oriented at an angle to the first portion 348 of the second stiffening segment 306, and a third portion 352 extending between the first portion 348 and the second portion 350 of the second stiffening segment 306. The second portion 350 of the second stiffening segment 306 is substantially perpendicular to the first portion 348 of the second stiffening segment 306. Based on the orientation of the stringer 300 illustrated in FIG. 3, the first portion 348 of the second stiffening segment 306 is oriented vertically, and the second portion 350 of the second stiffening segment 306 is oriented horizontally. The first and second portions 348, 350 of the second stiffening segment 306 are substantially linear, and the third portion 352 of the second stiffening segment 306 is curved and/or non-linear.

The second stiffening segment 306 of FIG. 3 further includes a first end 354 formed by the first portion 348 of the second stiffening segment 306, and a second end 356 formed by the second portion 350 of the second stiffening segment 306. The first end 354 of the second stiffening segment 306 has a flat edge 358 (e.g., a zero-degree chamfered edge) extending between the first and second surfaces 344, 346 of the second stiffening segment 306. The flat edge 358 of the first end 354 of the second stiffening segment 306 reduces the difficulty associated with coupling the reinforcement segment 314 to the second stiffening segment 306, as further described below. The second end 356 of the second stiffening segment 306 has an angled edge 360 (e.g., a chamfered edge) extending between the first and second surfaces 344, 346 of the second stiffening segment 306. The angled edge 360 of the second end 356 of the second stiffening segment 306 can be implemented as a chamfered edge having a chamfer angle of between twelve and eighteen degrees relative to the first surface 344 of the second stiffening segment 306 along the second portion 350 of the second stiffening segment 306. Implementation of the angled edge 360 as a chamfered edge having a chamfer angle of between twelve and eighteen degrees reduces (e.g., prevents) delamination.

The third portion 352 of the second stiffening segment 306 has a curvature defined by a radius of curvature 362 measured along the second surface 346 of the second stiffening segment 306 over the span of the third portion 352. The second stiffening segment 306 has a thickness 364 measured between the first and second surfaces 344, 346 of the second stiffening segment 306. The thickness 364 of the second stiffening segment 306 is substantially constant and/or uniform among and/or over the first, second and third portions 348, 350, 352 of the second stiffening segment 306. The constant and/or uniform thickness of the second reinforcement segment 306 provides for a part that is relatively easy to form and/or manufacture. The radius of curvature 362 of the second stiffening segment 306 of FIG. 3 is approximately ten millimeters (10 mm) in the illustrated example. The thickness 364 of the second stiffening segment 306 of FIG. 3 is approximately four millimeters (4 mm) in the illustrated example. Thus, the radius of curvature 362 and the thickness 364 of the second stiffening segment 306 of FIG. 3 are equal to corresponding ones of the radius of curvature 340 and the thickness 342 of the first stiffening segment 304 of FIG. 3 described above.

The base segment 308 of the stringer 300 of FIG. 3 includes a first surface 366 and a second surface 368 located opposite the first surface 366. The first surface 366 of the base segment 308 faces and/or is oriented toward the first stiffening segment 304 and/or the second stiffening segment 306 of the stringer 300. The second surface 368 of the base segment 308 faces and/or is oriented away from the first stiffening segment 304 and/or the second stiffening segment 306 of the stringer 300. The base segment 308 includes and/or is formed from multiple plies of material sandwiched between the first and second surfaces 366, 368 of the base segment 308. For example, the base segment 308 can be formed by separate plies of CFRP material that are stacked and/or laid up relative to one another.

The base segment 308 of FIG. 3 further includes a first portion 370, a second portion 372 located opposite the first portion 370 of the base segment 308, and a third portion 374 extending between the first portion 370 and the second portion 372 of the base segment 308. The first, second and third portions 370, 372, 374 of the base segment 308 are aligned and/or are substantially parallel to one another. Based on the orientation of the stringer 300 illustrated in FIG. 3, each of the first, second and third portions 370, 372, 374 of the base segment 308 is oriented horizontally.

The base segment 308 of FIG. 3 further includes a first end 376 formed by the first portion 370 of the base segment 308, and a second end 378 formed by the second portion 372 of the base segment 308. The first end 376 of the base segment 308 has an angled edge 380 (e.g., a chamfered edge) extending between the first and second surfaces 366, 368 of the base segment 308. The second end 378 of the base segment 308 also has an angled edge 382 (e.g., a chamfered edge) extending between the first and second surfaces 366, 368 of the base segment 308. The angled edge 380 of the first end 376 of the base segment 308, and/or the angled edge 382 of the second end 378 of the base segment 308, can be implemented as a chamfered edge having a chamfer angle of between twelve and eighteen degrees relative to the first surface 366 of the base segment 308. Implementing the angled edge 380 and/or the angled edge 382 as a chamfered edge having a chamfer angle of between twelve and eighteen degrees reduces (e.g., prevents) delamination. In the illustrated example of FIG. 3, the angled edge 380 of the first end 376 of the base segment 308 of FIG. 3 is flush with the angled edge 338 of the second end 334 of the first stiffening segment 304 of FIG. 3, and the angled edge 382 of the second end 378 of the base segment 308 of FIG. 3 is flush with the angled edge 360 of the second end 356 of the second stiffening segment 306 of FIG. 3. Implementing the angled edge 380 to be flush with the angled edge 338, and further implementing the angled edge 382 to be flush with the angled edge 360, reduces (e.g., prevents) delamination The base segment 308 has a thickness 384 measured between the first and second surfaces 366, 368 of the base segment 308. The thickness 384 of the base segment 308 is substantially constant and/or uniform among and/or over the first, second and third portions 370, 372, 374 of the base segment 308. The constant and/or uniform thickness of the base segment 308 provides for a part that is relatively easy to form and/or manufacture. The thickness 384 of the base segment 308 of FIG. 3 is approximately four millimeters (4 mm) in the illustrated example. Thus, the thickness 384 of the base segment 308 is equal to corresponding ones of the thickness 342 of the first stiffening segment 304 and the thickness 364 of the second stiffening segment 306 of FIG. 3 described above.

The filler area 310 of the stringer 300 of FIG. 3 includes a cross-sectional area 386 that is generally defined and/or bounded by the third portion 330 of the first stiffening segment 304, the third portion 352 of the second stiffening segment 306, and the third portion 374 of the base segment 308 of FIG. 3 described above. The filler 312 is located within the filler area 310 and is retained therein. The cross-sectional area 386 of the filler area 310 and/or the filler 312 of FIG. 3 is approximately forty-three square millimeters (43 mm$^2$) in the illustrated example. The filler 312 of FIG. 3 can be implemented as a CFRP filler.

The reinforcement segment 314 of the stringer 300 of FIG. 3. includes a first surface 388 and a second surface 390 located opposite the first surface 388. The first surface 388 of the reinforcement segment 314 faces and/or is oriented away from the first portion 326 of the first stiffening segment 304 of FIG. 3, and away from the first portion 348 of the second stiffening segment 306 of FIG. 3. The second surface 390 of the reinforcement segment 314 faces and/or is oriented toward the first portion 326 of the first stiffening segment 304 of FIG. 3, and toward the first portion 348 of the second stiffening segment 306 of FIG. 3.

The reinforcement segment 314 of FIG. 3 includes and/or is formed by multiple plies of CFRP material. The multiple plies of CFRP material increase the impact strength of the first flange 316 of the stringer 300 of FIG. 3 relative to the first flange 214 of the known stringer 200 of FIG. 2. The reinforcement segment 314 includes at least four plies to facilitate the increase in impact strength. The reinforcement segment 314 has a thickness 392 measured between the first and second surfaces 388, 390 of the reinforcement segment 314. The thickness 392 of the reinforcement segment 314 is substantially constant and/or uniform among and/or over the span of the reinforcement segment 314. The constant and/or uniform thickness of the reinforcement segment 314 provides for a part that is relatively easy to form and/or manufacture. The thickness 392 of the reinforcement segment 314 of FIG. 3 is approximately two millimeters (2 mm) in the illustrated example.

The reinforcement segment 314 of FIG. 3 extends over and/or along the first portion 326 and the first end 332 of the first stiffening segment 304, and further extends over and/or along the first portion 348 and the first end 354 of the second stiffening segment 306. The reinforcement segment 314 extends over and/or along the first portion 326 of the first stiffening segment 304 toward the second portion 328 of the first stiffening segment 304, and further extends over and/or along the first portion 348 of the second stiffening segment 306 toward the second portion 350 of the second stiffening segment 306. The reinforcement segment 314 can extend along between thirty five percent (35%) and eighty five percent (85%) of a height dimension (labeled as "H" on FIG. 3) of the stringer 300 measured orthogonally from the first end 332 of the first stiffening segment 304 to the portion of the first surface 322 of the first stiffening segment 304 located at the second portion 328 of the first stiffening segment 304. The height dimension (H) of the stringer 300 can alternatively be measured orthogonally from the first end 354 of the second stiffening segment 306 to the portion of the first surface 344 of the second stiffening segment 306 located at the second portion 350 of the second stiffening segment 306. In the illustrated example of FIG. 3, the reinforcement segment 314 covers approximately seventy five percent (75%) of the height dimension (H) of the stringer 300. Implementing the reinforcement segment 314 to extend along between thirty five percent (35%) and eighty five percent (85%) of the height dimension (H) of the stringer 300 increases the crippling strength and/or buckling strength of the first flange 316 of the stringer 300 of FIG. 3 relative to the first flange 214 of the known stringer 200 of FIG. 2, while at the same time reducing the weight and/or material volume of the stringer 300 of FIG. 3 relative to the known stringer 200 of FIG. 2.

The first portion 348 of the second stiffening segment 306 of FIG. 3 is coupled (e.g., joined, bonded, adhered, etc.) to the first portion 326 of the first stiffening segment 304 of FIG. 3 described above. More specifically, the second surface 346 of the second stiffening segment 306 over the span of the first portion 348 of the second stiffening segment 306 of FIG. 3 is coupled to the second surface 324 of the first stiffening segment 304 over the span of the first portion 326 of the first stiffening segment 304 of FIG. 3.

The reinforcement segment 314 of FIG. 3 is coupled (e.g., joined, bonded, adhered, etc.) to the first portion 326 of the first stiffening segment 304 of FIG. 3 described above, and to the first portion 348 of the second stiffening segment 306 of FIG. 3 described above. More specifically, the second surface 390 of the reinforcement segment 314 of FIG. 3 is coupled to the first surface 322 of the first stiffening segment 304 of FIG. 3 along the span of the first portion 326 of the first stiffening segment 304, and to the first surface 344 of the second stiffening segment 306 of FIG. 3 along the span of the first portion 348 of the second stiffening segment 306. The second surface 390 of the reinforcement segment 314 of FIG. 3 is further coupled to the first end 332 (e.g., along the flat edge 336) of the first stiffening segment 304 of FIG. 3, and to the first end 354 (e.g., along the flat edge 358) of the second stiffening segment 306 of FIG. 3. The multi-ply structure of the CFRP reinforcement segment 314 of the stringer 300 of FIG. 3 increases the impact strength of the first flange 316 of the stringer 300 relative to the impact strength associated with the first flange 214 and the single-ply fiberglass end cap 220 of the known stringer 200 of FIG. 2 described above.

The first portion 370 of the base segment 308 of FIG. 3 is coupled (e.g., joined, bonded, adhered, etc.) to the second portion 328 of the first stiffening segment 304 of FIG. 3 described above. More specifically, the first surface 366 of the base segment 308 along the span of the first portion 370 of the base segment 308 of FIG. 3 is coupled to the second surface 324 of the first stiffening segment 304 over the span of the second portion 328 of the first stiffening segment 304 of FIG. 3.

The second portion 372 of the base segment 308 of FIG. 3 is coupled (e.g., joined, bonded, adhered, etc.) to the second portion 350 of the second stiffening segment 306 of FIG. 3 described above. More specifically, the first surface 366 of the base segment 308 along the span of the second portion 372 of the base segment 308 of FIG. 3 is coupled to the second surface 346 of the second stiffening segment 306 along the span of the second portion 350 of the second stiffening segment 306 of FIG. 3.

The first, second, and third portions 370, 372, 374 of the base segment 308 of FIG. 3 are coupled (e.g., joined, bonded, adhered, etc.) to the skin 302 of FIG. 3 described above. More specifically, the second surface 368 of the base segment 308 along the span of the first, second and third portions 370, 372, 374 of the base segment 308 of FIG. 3 is coupled to the skin 302 along a corresponding span of the skin 302 of FIG. 3.

The first flange 316 of the stringer 300 of FIG. 3 includes and/or is formed by the first portion 326 of the first stiffening segment 304, the first portion 348 of the second stiffening segment 306, and the reinforcement segment 314 of FIG. 3. The second flange 318 of the stringer 300 of FIG. 3 includes and/or is formed by the second portion 328 of the first stiffening segment 304 and the first portion 370 of the base segment 308 of FIG. 3. The third flange 320 of the stringer 300 of FIG. 3 includes and/or is formed by the second portion 350 of the second stiffening segment 306 and the second portion 372 of the base segment 308 of FIG. 3. The first flange 316 is substantially perpendicular to the second and third flanges 318, 320. The second and third flanges 318, 320 are aligned and/or are substantially parallel to one another. Based on the orientation of the stringer 300 illustrated in FIG. 3, the first flange 316 is oriented vertically, and the second and third flanges 318, 320 are oriented horizontally.

The first flange 316 of FIG. 3 has a thickness 394 that is equal to the sum of the thickness 342 of the first stiffening segment 304, the thickness 364 of the second stiffening segment 306, a first instance of the thickness 392 of the reinforcement segment 314 (e.g., adjacent the first stiffening segment 304), and a second instance of the thickness 392 of the reinforcement segment 314 (e.g., adjacent the second stiffening segment 306) of FIG. 3. The thickness 394 of the first flange 316 of FIG. 3 is accordingly approximately twelve millimeters (12 mm) in the illustrated example. The second flange 318 of FIG. 3 has a thickness 396 that is equal to the sum of the thickness 342 of the first stiffening segment 304 and the thickness 384 of the base segment 308 of FIG. 3. The thickness 396 of the second flange 318 of FIG. 3 is accordingly approximately eight millimeters (8 mm) in the illustrated example. The third flange 320 of FIG. 3 has a thickness 398 that is equal to the sum of the thickness 364 of the second stiffening segment 306 and the thickness 384 of the base segment 308 of FIG. 3. The thickness 398 of the third flange 320 of FIG. 3 is accordingly approximately eight millimeters (8 mm) in the illustrated example. Thus, the thickness 394 of the first flange 316 is greater than the thickness 396 of the second flange 318 and greater than the thickness 398 of the third flange 320, the thickness 396 of the second flange 318 is less than the thickness 394 of the first flange 316 and equal to the thickness 398 of the third flange 320, and the thickness 398 of the third flange 320 is less than the thickness 394 of the first flange 316 and equal to the thickness 396 of the second flange 318.

The stringer 300 of FIG. 3 differs structurally from the known stringer 200 of FIG. 2 in several respects. For example, while the thickness 394 of the first flange 316 of the stringer 300 of FIG. 3 is equal to the thickness 288 of the first flange 214 of the known stringer 200 of FIG. 2, the thickness 396 of the second flange 318 and the thickness 398 of the third flange 320 of the stringer 300 of FIG. 3 are respectively less than corresponding ones of the thickness 290 of the second flange 216 and the thickness 292 of the third flange 218 of the known stringer 200 of FIG. 2. As another example, the thickness 342 of the first stiffening segment 304, the thickness 364 of the second stiffening segment 306, and the thickness 384 of the base segment 308 of the stringer 300 of FIG. 3 are respectively less than corresponding ones of the thickness 242 of the first stiffening segment 204, the thickness 264 of the second stiffening segment 206, and the thickness 284 of the base segment 208 of the known stringer 200 of FIG. 2. As another example, the cross-sectional area 386 of the filler area 310 of the stringer 300 of FIG. 3 is less than the cross-sectional area 286 of the filler area 210 of the known stringer 200 of FIG. 2.

The above-described structural differences between the stringer 300 of FIG. 3 and the known stringer 200 of FIG. 2 result in the stringer 300 having numerous benefits and/or advantages relative to the known stringer 200. For example, the above-described reduced thicknesses of the first stiffening segment 304, second stiffening segment 306, base segment 308, second flange 318, and third flange 320 of the stringer 300 of FIG. 3 relative to the corresponding thicknesses of the first stiffening segment 204, second stiffening segment 206, base segment 208, second flange 216, and third flange 218 of the known stringer 200 of FIG. 2 result in the stringer 300 of FIG. 3 having a reduced material volume, a reduced weight, and/or a reduced production cost relative to the material volume, the weight, and/or the production cost of the known stringer 200 of FIG. 2.

As another example, the above-described reduced cross-sectional area 386 of the filler area 310 of the stringer 300 of FIG. 3 relative to the cross-sectional area 286 of the known stringer 200 of FIG. 2 reduces (e.g., minimizes and/or prevents) thermal cracking and/or the formation of wrinkles (e.g., the wrinkles 298 of FIG. 2 described above) within the stringer 300. Such a reduction in thermal cracking and/or in the formation of wrinkles results in an increase in the performance characteristic(s) (e.g., impact strength, crippling strength, buckling strength, etc.) of the stringer 300 of FIG. 3 relative to the known stringer 200 of FIG. 2. Furthermore, as discussed above, the multi-ply structure of the CFRP reinforcement segment 314 of the stringer 300 of FIG. 3 independently increases the impact strength of the first flange 316 of the stringer 300 relative to the impact strength associated with the first flange 214 and the single-ply fiberglass end cap 220 of the known stringer 200 of FIG. 2.

FIG. 4 is a perspective view of a composite blank 400 from which the reinforcement segment 314 of the stringer 300 of FIG. 3 can be fabricated. The composite blank 400 of FIG. 4 includes a first surface 402 and a second surface 404 located opposite the first surface 402. Respective ones of the first and second surfaces 402, 404 of the composite blank 400 have a generally rectangular shape 406 including a chordwise direction 408 shown as line A-A in FIG. 4 and a spanwise direction 410 shown as line B-B in FIG. 4. The spanwise direction 410 of the composite blank 400 corresponds to an axial direction of the stringer 300 of FIG. 3. The chordwise direction 408 of the composite blank 400 is oriented orthogonally relative to the spanwise direction 410 of the composite blank 400. FIG. 5 is an enlarged cross-sectional view of the composite blank 400 of FIG. 4 taken along line A-A of FIG. 4. FIG. 6 is an enlarged cross-sectional view of the composite blank 400 of FIG. 4 taken along line B-B of FIG. 4.

The composite blank 400 of FIGS. 4-6 includes a stack and/or layup of plies 502. Respective ones of the plies 502 within the stack and/or layup are formed from CFRP tape or CFRP fabric. The composite blank 400 of FIGS. 4-6 is accordingly a multi-ply CFRP material. In the illustrated example of FIGS. 4-6, the composite blank 400 includes a total of six plies 502. The composite blank 400 can include a stack and/or layup of plies that differs in number (e.g., four plies, eight plies, ten plies, etc.) from the stack and/or layup of plies 502 shown in FIGS. 4-6. For example, the number of plies 502 can be determined based on a thickness of respective ones of the plies 502 relative to a desired thickness of the composite blank 400 of FIGS. 4-6.

The plies 502 of the composite blank 400 of FIGS. 4-6 include a first ply 504, a second ply 506, a third ply 508, a fourth ply 510, a fifth ply 512, and a sixth ply 514. The first ply 504 can form the first surface 388 of the reinforcement segment 314 of FIG. 3, and the sixth ply 514 can form the second surface 390 of the reinforcement segment 314 of FIG. 3. In the illustrated example of FIGS. 4-6, the stack and/or layup of plies 502 of the composite blank 400 is a symmetric layup. As used herein, the term "symmetric layup" means a layup having an equal number of plies located on opposing sides of a symmetry line of the layup. For example, the composite blank 400 of FIGS. 4-6 is a symmetric layup having the first, second and third plies 504, 506, 508 located on a first side of a symmetry line 602 and having the fourth, fifth and sixth plies 510, 512, 514 located on a second side of the symmetry line 602 opposite the first side of the symmetry line 602. Implementing the stack and/or layup of plies 502 as a symmetric layup increases the crippling strength and/or buckling strength of the stringer 300 of FIG. 3 relative to the known stringer 200 of FIG. 2, simplifies the manufacturing process associated with forming the stringer 300 of FIG. 3, and also reduces (e.g., eliminates) the formation of wrinkles, thermal cracks, and/or distortions in the stringer 300 of FIG. 3 relative to the known stringer 200 of FIG. 2.

The stack and/or layup of plies 502 of the composite blank 400 of FIGS. 4-6 can be layered and/or constructed as a traditional layup. As used herein, the term "traditional layup" means a layering and/or build-up of plies oriented at angles of zero degrees (0°), plus/minus forty-five degrees (+/−45°), and ninety degrees (90°) only relative to an axial direction of a stringer. For example, a symmetric traditional layup of eight plies can have a first ply oriented at forty-five degrees, a second ply oriented at ninety degrees, a third ply oriented at minus forty-five degrees, a fourth ply oriented at zero degrees, a fifth ply oriented at zero degrees, a sixth ply oriented at minus forty-five degrees, a seventh ply oriented at ninety degrees, and an eighth ply oriented at forty-five degrees (e.g., a 45°/90°/−45°/0°/0°/−45°/90°/45° layup). The stack and/or layup of plies 502 of the composite blank 400 of FIGS. 4-6 can be layered and/or constructed as a traditional layup having a ply orientation composition including approximately fifty-five percent of the plies oriented at zero degrees, thirty-five percent of the plies oriented at plus/minus forty-five degrees, and ten percent of the plies oriented at ninety degrees (e.g., a 55/35/10 ply orientation composition). Implementing the stack and/or layup of plies 502 as a traditional layup increases the crippling strength and/or buckling strength of the stringer 300 of FIG. 3 relative to the known stringer 200 of FIG. 2, and also simplifies the manufacturing process associated with forming the stringer 300 of FIG. 3.

The stack and/or layup of plies 502 of the composite blank 400 of FIGS. 4-6 can alternatively be layered and/or constructed as a non-traditional layup. As used herein, the term "non-traditional layup" means a layering and/or build-up of plies oriented relative to the axial direction of the stringer at angles other than the specific angles of a traditional layup, as defined above. For example, a symmetric non-traditional layup of eight plies can have a first ply oriented at sixty degrees, a second ply oriented at five degrees, a third ply oriented at minus sixty degrees, a fourth ply oriented at minus five degrees, a fifth ply oriented at minus five degrees, a sixth ply oriented at minus sixty degrees, a seventh ply oriented at five degrees, and an eighth ply oriented at sixty degrees (e.g., a 60°/5°/−60°/−5°/−5°/−60°/5°/60° layup). Implementing the stack and/or layup of plies 502 as a non-traditional layup increases the crippling strength and/or buckling strength of the stringer 300 of FIG. 3 relative to the known stringer 200 of FIG. 2, simplifies the manufacturing process associated with forming the stringer 300 of FIG. 3, and also reduces (e.g., eliminates) the formation of wrinkles, thermal cracks, and/or distortions in the stringer 300 of FIG. 3 relative to the known stringer 200 of FIG. 2.

In the illustrated example of FIGS. 4-6, the first ply 504 of the composite blank 400 has a thickness 516. The respective thicknesses of corresponding ones of the second, third, fourth, fifth and sixth plies 506, 508, 510, 512, 514 of the composite blank 400 are equal to the thickness 516 of the first ply 504 of the composite blank 400. The respective thicknesses of corresponding ones of the second, third, fourth, fifth and sixth plies 506, 508, 510, 512, 514 of the composite blank 400 can alternatively differ (e.g., individually or collectively) from the thickness 516 of the first ply 504 of the composite blank 400.

As shown in FIG. 5, the respective lateral extents of corresponding ones of the plies 502 along the chordwise direction 408 of the composite blank 400 successively decrease from the first ply 504 through the sixth ply 514. For example, the lateral extent of the second ply 506 in the chordwise direction 408 is less than the lateral extent of the first ply 504 in the chordwise direction 408, the lateral extent of the third ply 508 in the chordwise direction 408 is less than the lateral extent of the second ply 506 in the chordwise direction 408, the lateral extent of the fourth ply 510 in the chordwise direction 408 is less than the lateral extent of the third ply 508 in the chordwise direction 408, the lateral extent of the fifth ply 512 in the chordwise direction 408 is less than the lateral extent of the fourth ply 510 in the chordwise direction 408, and the lateral extent of the sixth ply 514 in the chordwise direction 408 is less than the lateral extent of the fifth ply 512 in the chordwise direction 408.

The above-described differences in the respective lateral extents of corresponding ones of the plies 502 along the chordwise direction 408 of the composite blank 400 are defined by a chordwise stagger distance 518 implemented between successively-layered ones of the plies 502. For example, the second ply 506 is laterally staggered in the chordwise direction 408 relative to the first ply 504 by the chordwise stagger distance 518, the third ply 508 is laterally staggered in the chordwise direction 408 relative to the second ply 506 by the chordwise stagger distance 518, the fourth ply 510 is laterally staggered in the chordwise direction 408 relative to the third ply 508 by the chordwise stagger distance 518, the fifth ply 512 is laterally staggered in the chordwise direction 408 relative to the fourth ply 510 by the chordwise stagger distance 518, and the sixth ply 514 is laterally staggered in the chordwise direction 408 relative to the fifth ply 512 by the chordwise stagger distance 518.

In the illustrated example of FIG. 5, the chordwise stagger distance 518 is the same (e.g., has the same value) between each of the successively-layered ones of the plies 502 of the composite blank 400. Implementing the same chordwise stagger distance between each of the successively-layered ones of the plies 502 reduces (e.g., prevents) delamination, and also provides for a part that is relatively easy to form and/or manufacture. The chordwise stagger distance 518 can alternatively vary (e.g., change in value) from one successively-layered pair of plies (e.g., the first and second plies 504, 506) to the next successively-layered pair of plies (e.g., the second and third plies 506, 508). The composite blank 400 of FIGS. 4-6 has a chordwise ply drop ratio calculated as the ratio of the chordwise stagger distance 518 of the plies 502 to the thickness 516 of individual ones of the plies 502. The chordwise ply drop ratio of the composite blank 400 can have a value between three (3) and thirty (30). Implementing a chordwise ply drop ratio between three (3) and thirty (30) reduces (e.g., prevents) delamination, and also reduces (e.g., eliminates) the need for one or more post-curing trimming steps associated with the manufacture of the stringer 300 of FIG. 3 relative to the known stringer 200 of FIG. 2.

As shown in FIG. 6, the respective lateral extents of corresponding ones of the plies 502 along the spanwise direction 410 of the composite blank 400 successively decrease from the first ply 504 through the fourth ply 510, and successively increase from the fourth ply 510 through the sixth ply 514. For example, the lateral extent of the second ply 506 in the spanwise direction 410 is less than the lateral extent of the first ply 504 in the spanwise direction 410, the lateral extent of the third ply 508 in the spanwise direction 410 is less than the lateral extent of the second ply 506 in the spanwise direction 410, the lateral extent of the fourth ply 510 in the spanwise direction 410 is less than the lateral extent of the third ply 508 in the spanwise direction 410, the lateral extent of the fifth ply 512 in the spanwise direction 410 is greater than the lateral extent of the fourth ply 510 in the spanwise direction 410, and the lateral extent of the sixth ply 514 in the spanwise direction 410 is greater than the lateral extent of the fifth ply 512 in the chordwise direction 410.

The above-described differences in the respective lateral extents of corresponding ones of the plies 502 along the spanwise direction 410 of the composite blank 400 are defined by a spanwise stagger distance 604 implemented between successively-layered ones of the plies 502. For example, the second ply 506 is laterally staggered in the spanwise direction 410 relative to the first ply 504 by the spanwise stagger distance 604, the third ply 508 is laterally staggered in the spanwise direction 410 relative to the second ply 506 by the spanwise stagger distance 604, the fourth ply 510 is laterally staggered in the spanwise direction 410 relative to the third ply 508 by the spanwise stagger distance 604, the fifth ply 512 is laterally staggered in the spanwise direction 410 relative to the fourth ply 510 by the spanwise stagger distance 604, and the sixth ply 514 is laterally staggered in the spanwise direction 410 relative to the fifth ply 512 by the spanwise stagger distance 604.

In the illustrated example of FIG. 6, the spanwise stagger distance 604 is the same (e.g., has the same value) between each of the successively-layered ones of the plies 502 of the composite blank 400. Implementing the same spanwise stagger distance between each of the successively-layered ones of the plies 502 reduces (e.g., prevents) delamination, and also provides for a part that is relatively easy to form and/or manufacture. The spanwise stagger distance 604 can alternatively vary (e.g., change in value) from one successively-layered pair of plies (e.g., the first and second plies 504, 506) to the next successively-layered pair of plies (e.g., the second and third plies 506, 508). The composite blank 400 of FIGS. 4-6 has a spanwise ply drop ratio calculated as the ratio of the spanwise stagger distance 604 of the plies 502 to the thickness 516 of individual ones of the plies 502. The spanwise ply drop ratio of the composite blank 400 can have a value between one hundred (100) and three hundred (300). Implementing a spanwise ply drop ratio between one hundred (100) and three hundred (300) reduces (e.g., prevents) delamination, and also reduces (e.g., eliminates) the need for one or more post-curing trimming steps associated with the manufacture of the stringer 300 of FIG. 3 relative to the known stringer 200 of FIG. 2.

FIG. 7 is a perspective view of a composite blank 700 from which the first and second stiffening segments 304, 306, or the base segment 308 of the stringer 300 of FIG. 3 can be fabricated. The composite blank 700 of FIG. 7 includes a first surface 702 and a second surface 704 located opposite the first surface 702. Respective ones of the first and second surfaces 702, 704 of the composite blank 700 have a generally rectangular shape 706 including a chordwise direction 708 shown as line A-A in FIG. 7 and a spanwise direction 710 shown as line B-B in FIG. 7. The spanwise direction 710 of the composite blank 700 corresponds to an axial direction of the stringer 300 of FIG. 3. The chordwise direction 708 of the composite blank 700 is oriented orthogonally relative to the spanwise direction 710 of the composite blank 700. FIG. 8 is an enlarged cross-sectional view of the composite blank 700 of FIG. 7 taken along line A-A of FIG. 7. FIG. 9 is an enlarged cross-sectional view of the composite blank 700 of FIG. 7 taken along line B-B of FIG. 7.

The composite blank 700 of FIGS. 7-9 includes a stack and/or layup of plies 802. In the illustrated example of FIGS. 7-9, the composite blank 700 includes a total of six plies 802. The composite blank 700 can alternatively include a stack and/or layup of plies that differs in number (e.g., four plies, eight plies, ten plies, etc.) from the stack and/or layup of plies 802 shown in FIGS. 7-9. For example, the number of plies 802 can be determined based on a thickness of respective ones of the plies 802 relative to a desired thickness of the composite blank 700 of FIGS. 7-9. The plies 802 of the composite blank 700 of FIGS. 7-9 include a first ply 804, a second ply 806, a third ply 808, a fourth ply 810, a fifth ply 812, and a sixth ply 814. In the context of fabricating the first stiffening segment 304 of FIG. 3 or the second stiffening segment 306 of FIG. 3, the first ply 804 can form the second surface 324 of the first stiffening segment 304 and the second surface 346 of the second stiffening segment 306, and the sixth ply 814 can form the first surface 322 of the first stiffening segment 304 and the first surface 344 of the second stiffening segment 306. In the context of forming the base segment 308 of FIG. 3, the first ply 804 can form the first surface 366 of the base segment 308, and the sixth ply 814 can form the second surface 368 of the base segment 308.

In the illustrated example of FIGS. 7-9, the stack and/or layup of plies 802 of the composite blank 700 is a symmetric layup. For example, the composite blank 700 of FIGS. 7-9 is a symmetric layup having the first, second and third plies 804, 806, 808 located on a first side of a symmetry line 902 and having the fourth, fifth and sixth plies 810, 812, 814 located on a second side of the symmetry line 902 opposite the first side of the symmetry line 902.

The stack and/or layup of plies 802 of the composite blank 700 of FIGS. 7-9 can be layered and/or constructed as a traditional layup. The stack and/or layup of plies 802 of the composite blank 700 of FIGS. 7-9 can be layered and/or constructed as a traditional layup having a ply orientation composition including approximately fifty percent of the plies oriented at zero degrees, thirty-eight percent of the plies oriented at plus/minus forty-five degrees, and twelve percent of the plies oriented at ninety degrees (e.g., a 50/38/12 ply orientation composition). Implementing the stack and/or layup of plies 582 as a traditional layup increases the crippling strength and/or buckling strength of the stringer 300 of FIG. 3 relative to the known stringer 200 of FIG. 2, and also simplifies the manufacturing process associated with forming the stringer 300 of FIG. 3. The stack and/or layup of plies 802 of the composite blank 700 of FIGS. 7-9 can alternatively be layered and/or constructed as a non-traditional layup. Implementing the stack and/or layup of plies 802 as a non-traditional layup increases the crippling strength and/or buckling strength of the stringer 300 of FIG. 3 relative to the known stringer 200 of FIG. 2, simplifies the manufacturing process associated with forming the stringer 300 of FIG. 3, and also reduces (e.g., eliminates) the formation of wrinkles, thermal cracks, and/or distortions in the stringer 300 of FIG. 3 relative to the known stringer 200 of FIG. 2.

In the illustrated example of FIGS. 7-9, the sixth ply 814 of the composite blank 400 has a thickness 816. The respective thicknesses of corresponding ones of the first, second, third, fourth and fifth plies 804, 806, 808, 810, 812 of the composite blank 700 are equal to the thickness 816 of the sixth ply 814 of the composite blank 400. The respective thicknesses of corresponding ones of the first, second, third, fourth, and fifth plies 804, 806, 808, 810, 812 of the composite blank 700 can alternatively differ (e.g., individually or collectively) from the thickness 816 of the sixth ply 814 of the composite blank 700.

As shown in FIG. 8, the respective lateral extents of corresponding ones of the plies 802 along the chordwise direction 708 of the composite blank 700 successively increase from the first ply 804 through the sixth ply 814. For example, the lateral extent of the second ply 806 in the chordwise direction 708 is greater than the lateral extent of the first ply 804 in the chordwise direction 708, the lateral extent of the third ply 808 in the chordwise direction 708 is greater than the lateral extent of the second ply 806 in the chordwise direction 708, the lateral extent of the fourth ply 810 in the chordwise direction 708 is greater than the lateral extent of the third ply 808 in the chordwise direction 708, the lateral extent of the fifth ply 812 in the chordwise direction 708 is greater than the lateral extent of the fourth ply 810 in the chordwise direction 708, and the lateral extent of the sixth ply 814 in the chordwise direction 708 is greater than the lateral extent of the fifth ply 812 in the chordwise direction 708.

The above-described differences in the respective lateral extents of corresponding ones of the plies 802 along the chordwise direction 708 of the composite blank 700 are defined by a chordwise stagger distance 818 implemented between successively-layered ones of the plies 802. For example, the second ply 806 is laterally staggered in the chordwise direction 708 relative to the first ply 804 by the chordwise stagger distance 818, the third ply 808 is laterally staggered in the chordwise direction 708 relative to the second ply 806 by the chordwise stagger distance 818, the fourth ply 810 is laterally staggered in the chordwise direction 708 relative to the third ply 808 by the chordwise stagger distance 818, the fifth ply 812 is laterally staggered in the chordwise direction 708 relative to the fourth ply 810 by the chordwise stagger distance 818, and the sixth ply 814 is laterally staggered in the chordwise direction 708 relative to the fifth ply 812 by the chordwise stagger distance 818.

In the illustrated example of FIG. 8, the chordwise stagger distance 818 is the same (e.g., has the same value) between each of the successively-layered ones of the plies 802 of the composite blank 700. Implementing the same chordwise stagger distance between each of the successively-layered ones of the plies 802 reduces (e.g., prevents) delamination, and also provides for a part that is relatively easy to form and/or manufacture. The chordwise stagger distance 818 can alternatively vary (e.g., change in value) from one successively-layered pair of plies (e.g., the first and second plies 804, 806) to the next successively-layered pair of plies (e.g., the second and third plies 806, 808). The composite blank 700 of FIGS. 7-9 has a chordwise ply drop ratio calculated as the ratio of the chordwise stagger distance 818 of the plies 802 to the thickness 816 of individual ones of the plies 802. The chordwise ply drop ratio of the composite blank 700 can have a value between three (3) and thirty (30). Implementing a chordwise ply drop ratio between three (3) and thirty (30) reduces (e.g., prevents) delamination, and also reduces (e.g., eliminates) the need for one or more post-curing trimming steps associated with the manufacture of the stringer 300 of FIG. 3 relative to the known stringer 200 of FIG. 2.

As shown in FIG. 9, the respective lateral extents of corresponding ones of the plies 802 along the spanwise direction 710 of the composite blank 700 successively decrease from the first ply 804 through the fourth ply 810, and successively increase from the fourth ply 810 through the sixth ply 814. For example, the lateral extent of the second ply 806 in the spanwise direction 710 is less than the lateral extent of the first ply 804 in the spanwise direction 710, the lateral extent of the third ply 808 in the spanwise direction 710 is less than the lateral extent of the second ply 806 in the spanwise direction 710, the lateral extent of the fourth ply 810 in the spanwise direction 710 is less than the lateral extent of the third ply 808 in the spanwise direction 710, the lateral extent of the fifth ply 812 in the spanwise direction 710 is greater than the lateral extent of the fourth ply 810 in the spanwise direction 710, and the lateral extent of the sixth ply 814 in the spanwise direction 710 is greater than the lateral extent of the fifth ply 812 in the chordwise direction 710.

The above-described differences in the respective lateral extents of corresponding ones of the plies 802 along the spanwise direction 710 of the composite blank 700 are defined by a spanwise stagger distance 904 implemented between successively-layered ones of the plies 802. For example, the second ply 806 is laterally staggered in the spanwise direction 710 relative to the first ply 804 by the spanwise stagger distance 904, the third ply 808 is laterally staggered in the spanwise direction 710 relative to the second ply 806 by the spanwise stagger distance 904, the fourth ply 810 is laterally staggered in the spanwise direction 710 relative to the third ply 808 by the spanwise stagger distance 904, the fifth ply 812 is laterally staggered in the spanwise direction 710 relative to the fourth ply 810 by the spanwise stagger distance 904, and the sixth ply 814 is laterally staggered in the spanwise direction 710 relative to the fifth ply 812 by the spanwise stagger distance 904.

In the illustrated example of FIG. 9, the spanwise stagger distance 904 is the same (e.g., has the same value) between each of the successively-layered ones of the plies 802 of the composite blank 700. Implementing the same spanwise stagger distance between each of the successively-layered ones of the plies 802 reduces (e.g., prevents) delamination, and also provides for a part that is relatively easy to form and/or manufacture. The spanwise stagger distance 904 can alternatively vary (e.g., change in value) from one successively-layered pair of plies (e.g., the first and second plies 804, 806) to the next successively-layered pair of plies (e.g., the second and third plies 806, 808). The composite blank 700 of FIGS. 7-9 has a spanwise ply drop ratio calculated as the ratio of the spanwise stagger distance 904 of the plies 802 to the thickness 816 of individual ones of the plies 802. The spanwise ply drop ratio can have a value between one hundred twenty (120) and three hundred (300). Implementing a spanwise ply drop ratio between three (3) and thirty (30) reduces (e.g., prevents) delamination, and also reduces (e.g., eliminates) the need for one or more post-curing trimming steps associated with the manufacture of the stringer 300 of FIG. 3 relative to the known stringer 200 of FIG. 2.

FIGS. 10A-10K illustrate a process 1000 used to manufacture the stringer 300 of FIG. 3. During a first stage 1002 of the process 1000 shown in FIG. 10A, a first composite blank 1004 is pre-heated using a heat blanket 1006. The first composite blank 1004 can be implemented via the composite blank 700 of FIGS. 7-9 described above. The first composite blank 1004 can be heated via the heat blanket 1006 at a temperature of one hundred fifty degrees Fahrenheit (150° F.) for between twenty and thirty minutes.

The first stage 1002 of the process 1000 shown in FIG. 10A further includes placing the first composite blank 1004 on a forming block 1008. The forming block 1008 has first and second parts 1010, 1012 that are separable from one another. In the illustrated example of FIG. 10A, the first and second parts 1010, 1012 of the forming block 1008 are symmetric to one another. The first composite blank 1004 can be placed on the forming block 1008 prior to the first composite blank 1004 being pre-heated. The first composite blank 1004 can alternatively be placed on the forming block 1008 after the first composite blank 1004 has been pre-heated.

During a second stage 1014 of the process 1000 shown in FIG. 10B, the first composite blank 1004 is draped over and/or around the forming block 1008. One or more roller(s) 1016 (e.g., one or more robotic roller(s)) can apply force to the first composite blank 1004 to assist in draping the first composite blank 1004 over and/or around the forming block 1008.

Figure 10C:
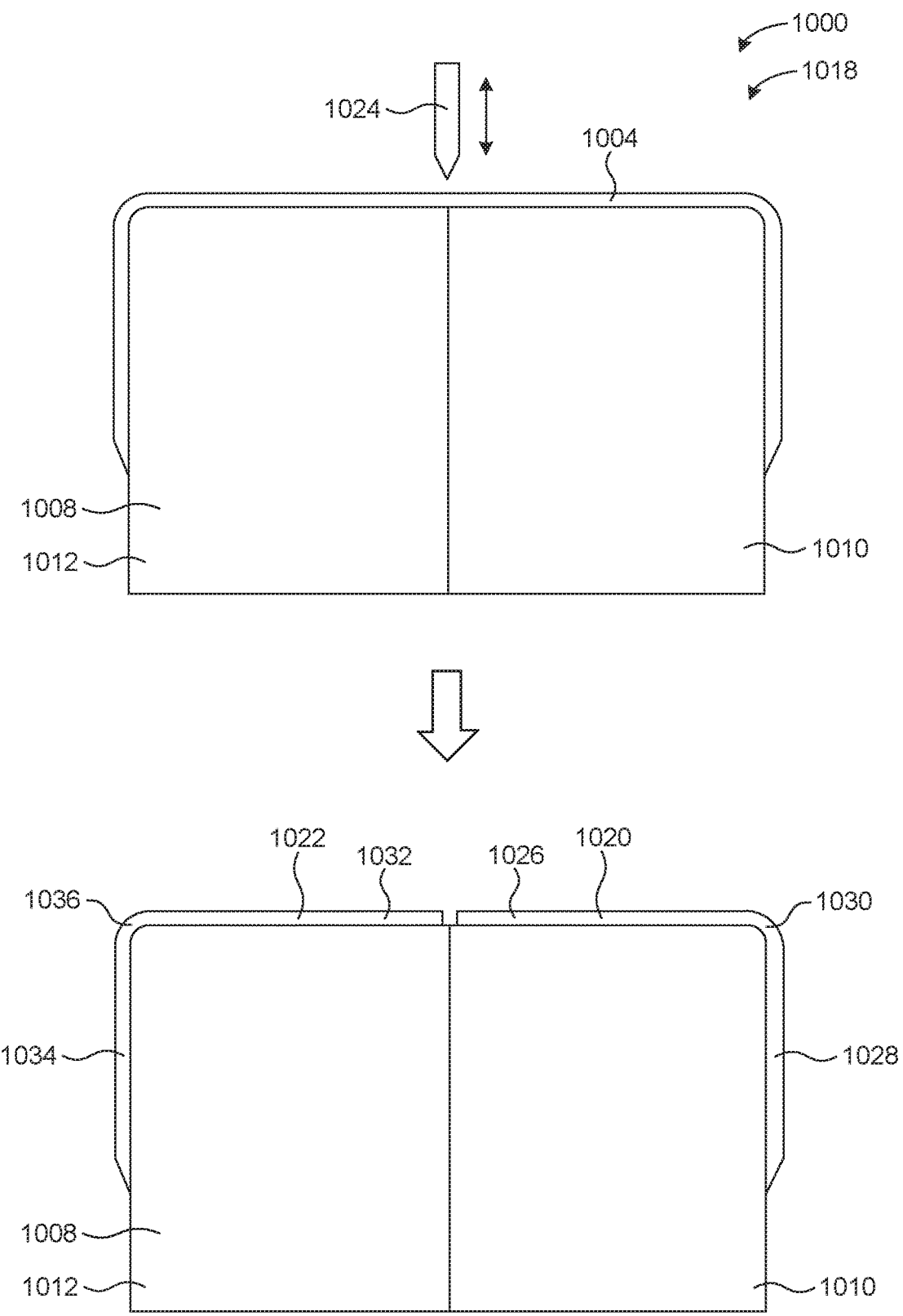

During a third stage 1018 of the process 1000 shown in FIG. 10C, the first composite blank 1004 is cut and/or divided into first and second stiffening segments 1020, 1022 via a cutting device 1024. The cutting device 1024 can be implemented via an ultrasonic knife. In the illustrated example of FIG. 10C, the first and second stiffening segments 1020, 1022 are symmetric to one another. The first stiffening segment 1020 of the first composite blank 1004 includes a first portion 1026, a second portion 1028 oriented at an angle to the first portion 1026, and a third portion 1030 extending between the first portion 1026 and the second portion 1028. The second stiffening segment 1022 of the first composite blank 1004 includes a first portion 1032, a second portion 1034 oriented at an angle to the first portion 1032, and a third portion 1036 extending between the first portion 1032 and the second portion 1034.

Figure 10D:
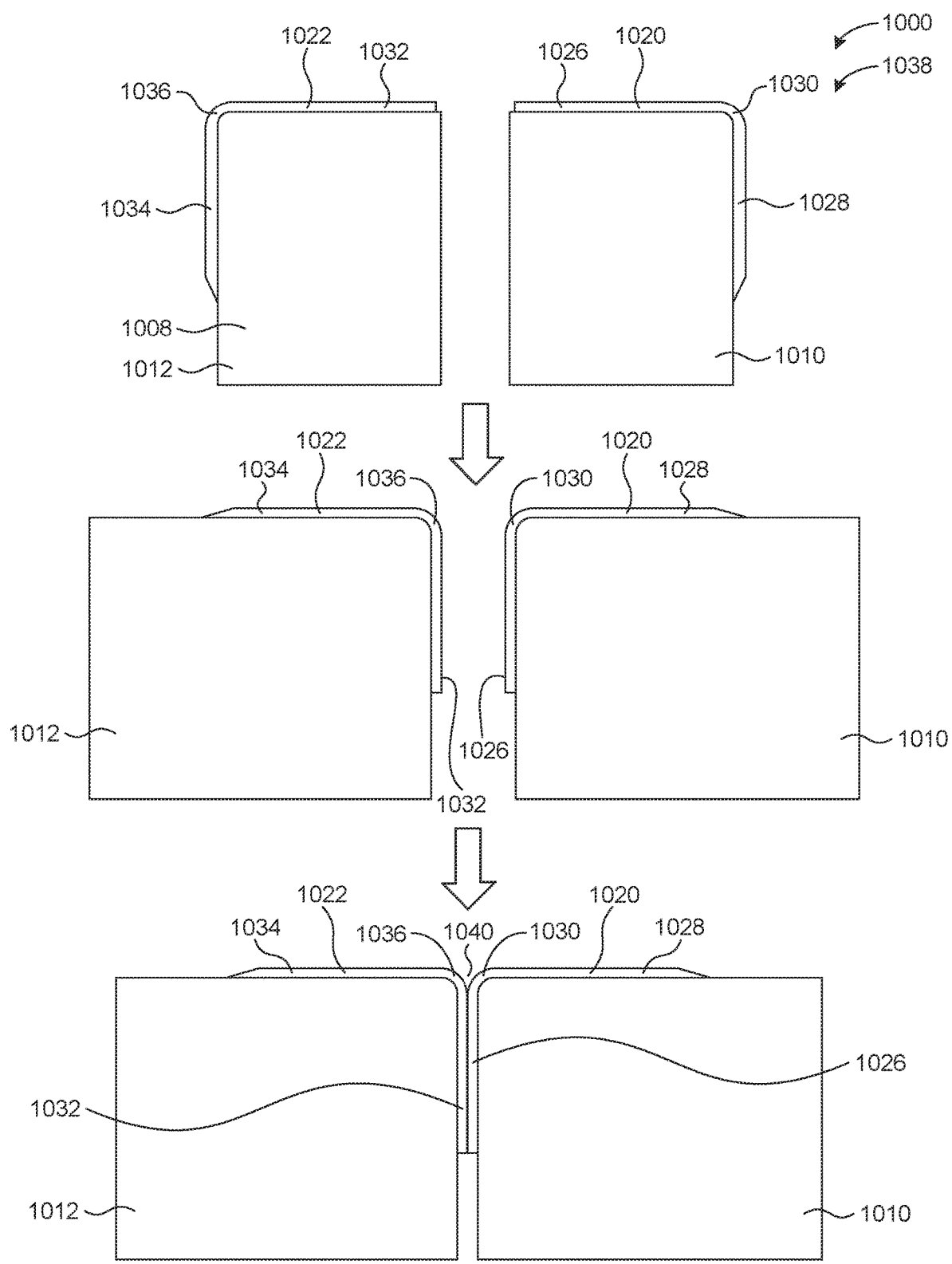

During a fourth stage 1038 of the process 1000 shown in FIG. 10D, the first and second parts 1010, 1012 of the forming block 1008 carrying the first and second stiffening segments 1020, 1022 of the first composite blank 1004 are separated from one another and reoriented (e.g., rotated) relative to one another such that the first portion 1026 of the first stiffening segment 1020 is placed into face-to-face contact with the first portion 1032 of the second stiffening segment 1022. Placing the first portion 1026 of the first stiffening segment 1020 into face-to-face contact with the first portion 1032 of the second stiffening segment 1022 as shown in FIG. 10D results in a filler area 1040 being formed between the third portion 1030 of the first stiffening segment 1020 and the third portion 1036 of the second stiffening segment 1022.

The fourth stage 1038 of the process 1000 shown in FIG. 10D further includes coupling (e.g., joining, bonding, adhering, etc.) the first portion 1026 of the first stiffening segment 1020 to the first portion 1032 of the second stiffening segment 1022. The first portion 1026 of the first stiffening segment 1020 can be coupled to the first portion 1032 of the second stiffening segment 1022 in connection with placing the first portion 1026 of the first stiffening segment 1020 into face-to-face contact with the first portion 1032 of the second stiffening segment 1022.

Figure 10E:
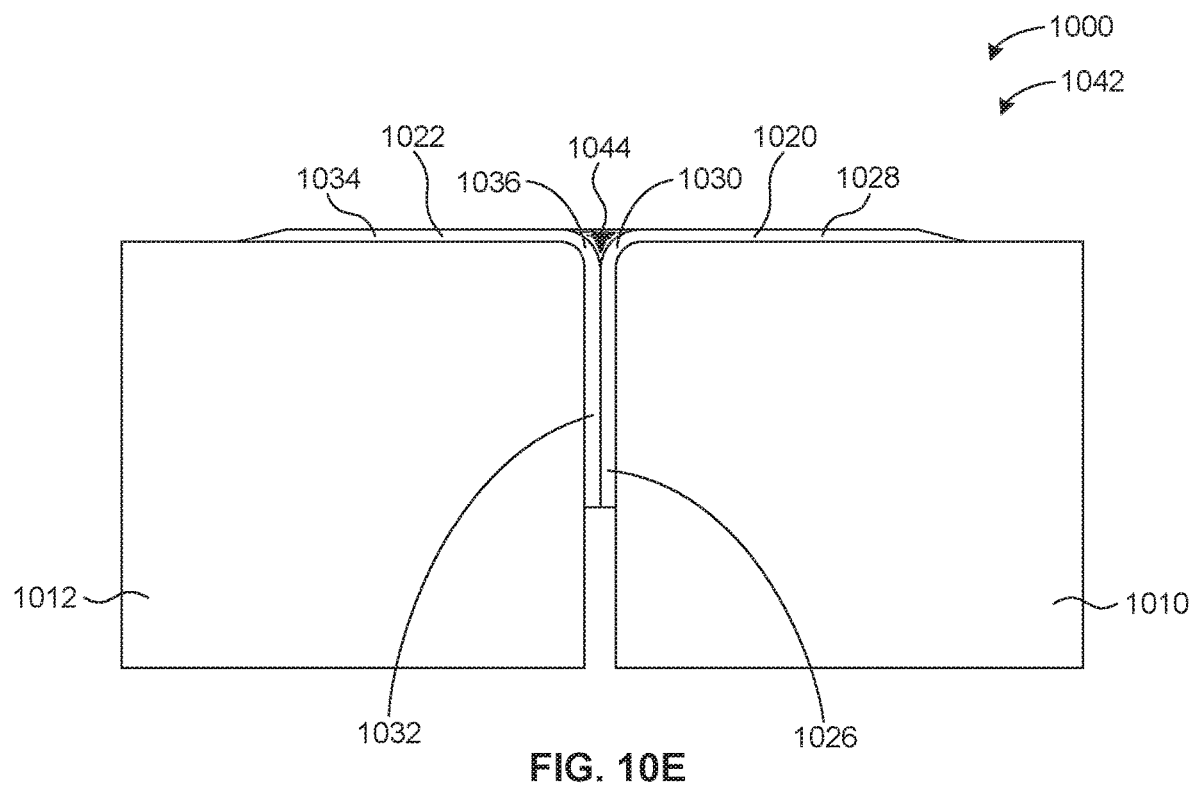

During a fifth stage 1042 of the process 1000 shown in FIG. 10E, a filler 1044 is inserted into the filler area 1040. The filler 1044 of FIG. 10E can be implemented as a CFRP filler that is formed and subsequently inserted into the filler area 1040.

Figure 10F:
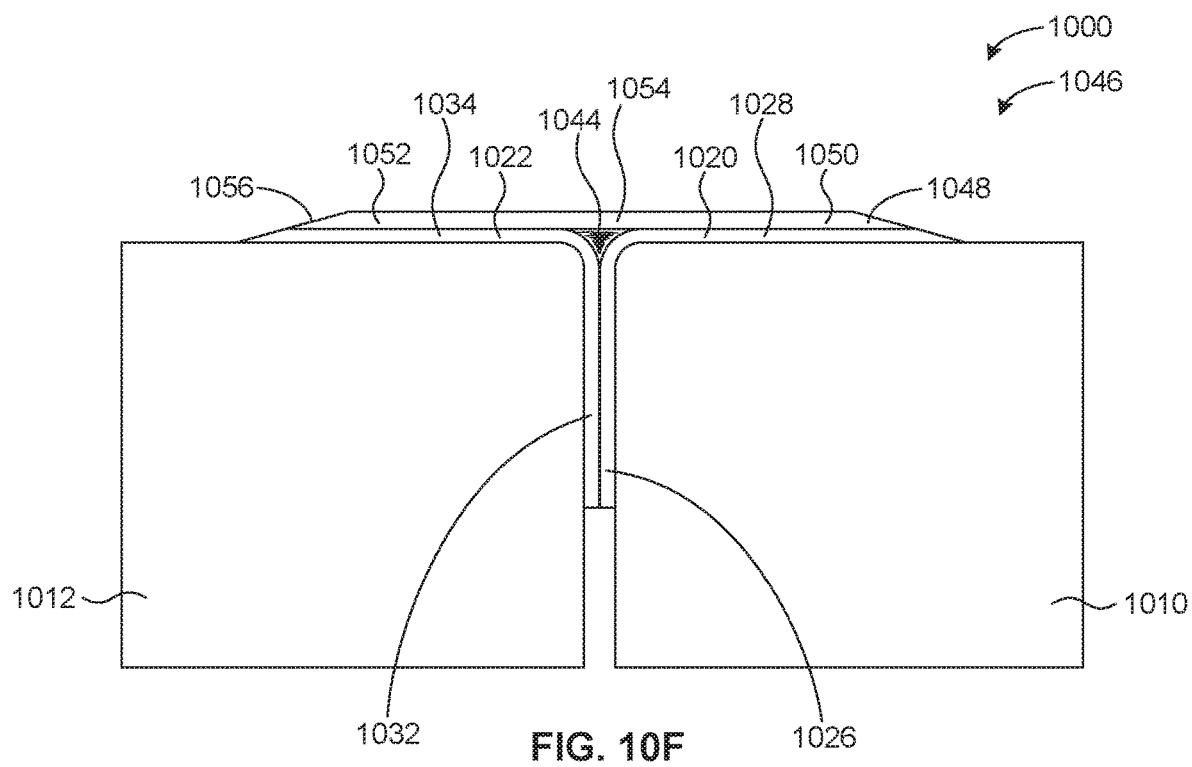

During a sixth stage 1046 of the process 1000 shown in FIG. 10F, a second composite blank 1048 is placed on and/or over the second portion 1028 of the first stiffening segment 1020, the second portion 1034 of the second stiffening segment 1022, and the filler 1044. The second composite blank 1048 of FIG. 10F can be implemented via the composite blank 700 of FIGS. 7-9 described above. The second composite blank 1048 of FIG. 10F includes a first portion 1050, a second portion 1052 located opposite the first portion 1050, and a third portion 1054 extending between the first and second portions 1050, 1052. Placing the second composite blank 1048 relative to the first and second stiffening segments 1020, 1022 and the filler 1044 during the sixth stage 1046 of the process 1000 shown in FIG. 10F can include placing the first portion 1050 of the second composite blank 1048 into face-to-face contact with the second portion 1028 of the first stiffening segment 1020, placing the second portion 1052 of the second composite blank 1048 into face-to-face contact with the second portion 1034 of the second stiffening segment 1022, and placing the third portion 1054 of the second composite blank 1048 into face-to-face contact with the filler 1044.

The sixth stage 1046 of the process 1000 shown in FIG. 10F further includes coupling (e.g., joining, bonding, adhering, etc.) the second composite blank 1048 to the first and second stiffening segments 1020, 1022 to provide a formed structure 1056 including the first and second stiffening segments 1020, 1022, the filler 1044, and the second composite blank 1048. The formed structure 1056 can thereafter be removed, released, and/or ejected from the first and second parts 1010, 1012 of the forming block 1008 for further processing, treatment and/or handling, as described below.

During a seventh stage 1058 of the process 1000 shown in FIG. 10G, a base segment pre-layup 1060 is placed on a skin 1062. The base segment pre-layup 1060 of FIG. 10G can include a single ply of material. The base segment pre-layup 1060 of FIG. 10G can alternatively include multiple plies of material (e.g., two plies, four plies, etc.) formed in a stack or layup. The seventh stage 1058 of the process 1000 shown in FIG. 10G further includes coupling (e.g., joining, bonding, adhering, etc.) the base segment pre-layup 1060 to the skin 1062. The base segment pre-layup 1060 can be coupled to the skin 1062 in connection with placing the base segment pre-layup 1060 on the skin 1062.

During an eighth stage 1064 of the process 1000 shown in FIG. 10H, the formed structure 1056 is placed on the base segment pre-layup 1060. The eighth stage 1064 of the process 1000 shown in FIG. 10H further includes coupling (e.g., joining, bonding, adhering, etc.) the formed structure 1056 to the base segment pre-layup 1060. The formed structure 1056 can be coupled to the base segment pre-layup 1060 in connection with placing the formed structure 1056 on the base segment pre-layup 1060.

The eighth stage 1064 of the process 1000 shown in FIG. 10H further includes forming first and second angled edges 1066, 1068 (e.g., first and second chamfered edges) of the formed structure 1056. The first and second angled edges 1066, 1068 can be formed in connection with placing the formed structure 1056 on the base segment pre-layup 1060, and/or coupling the formed structure 1056 to the base segment pre-layup 1060.

Figure 10I:
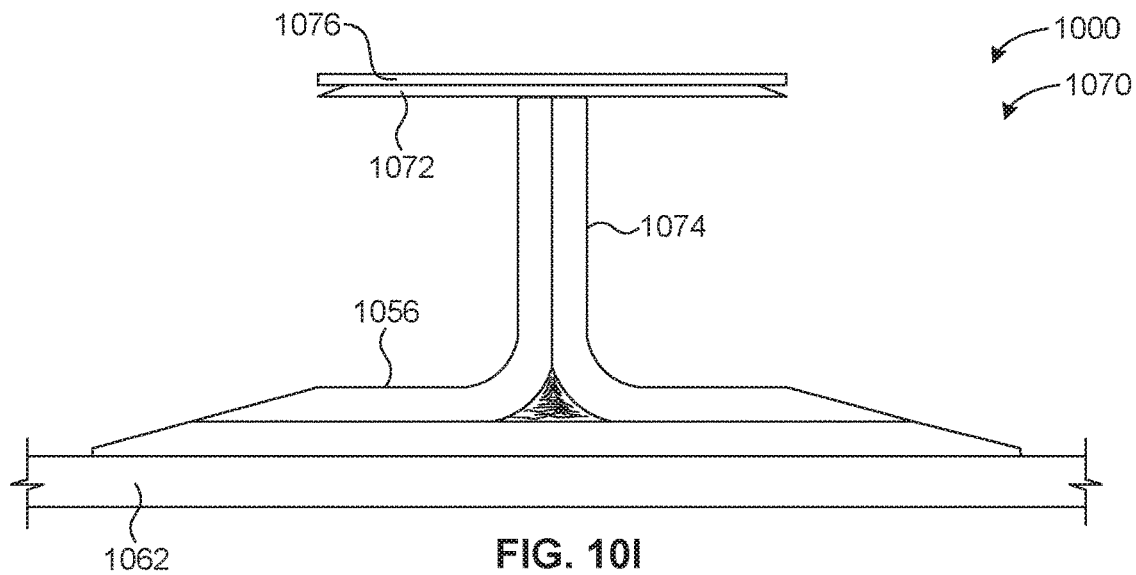

During a ninth stage 1070 of the process 1000 shown in FIG. 10I, a third composite blank 1072 is pre-heated using a heat blanket 1074. The third composite blank 1072 can be implemented via the composite blank 400 of FIGS. 4-6 described above. The third composite blank 1072 can be heated via the heat blanket 1074 at a temperature of one hundred fifty degrees Fahrenheit (150° F.) for between twenty and thirty minutes.

The ninth stage 1070 of the process 1000 shown in FIG. 10I further includes placing the third composite blank 1072 on a flange 1076 of the formed structure 1056. The flange 1076 of the formed structure 1056 is formed via the first portion 1026 of the first stiffening segment 1020 and the first portion 1032 of the second stiffening segment 1022 of the formed structure 1056. The third composite blank 1072 can be placed on the flange 1076 prior to the third composite blank 1072 being pre-heated. The third composite blank 1072 can alternatively be placed on the flange 1076 after the third composite blank 1072 has been pre-heated.

Figure 10J:
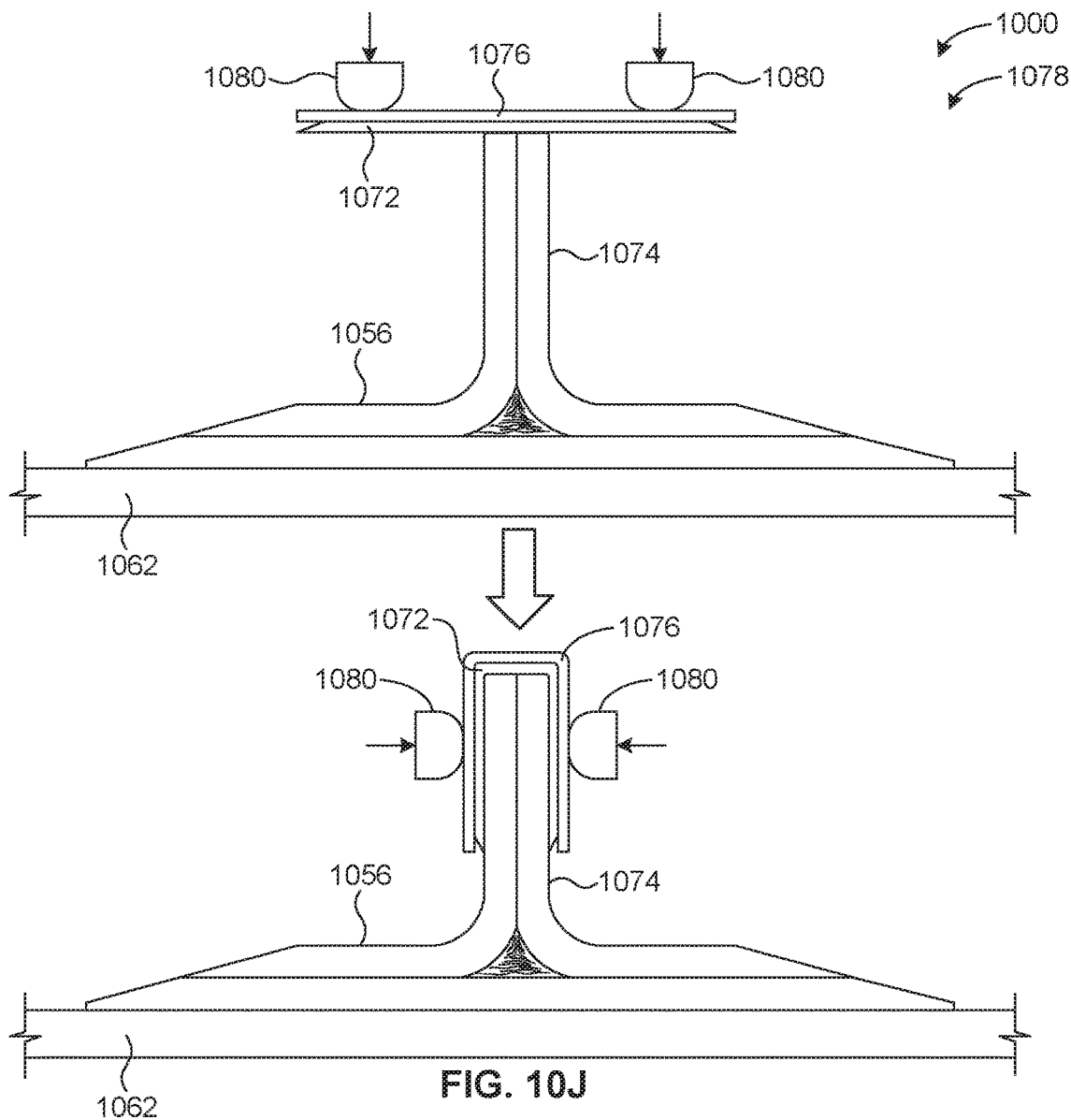

During a tenth stage 1078 of the process 1000 shown in FIG. 10J, the third composite blank 1072 is draped over and/or around the flange 1076. One or more roller(s) 1080 (e.g., one or more robotic roller(s)) can apply force to the third composite blank 1072 to assist in draping the third composite blank 1072 over and/or around the flange 1076. The tenth stage 1078 of the process 1000 shown in FIG. 10J further includes coupling (e.g., joining, bonding, adhering, etc.) the third composite blank 1072 to the flange 1076. The third composite blank 1072 can be coupled to the flange 1076 in connection with draping the third composite blank 1072 over and/or around the flange 1076.

Figure 10K:
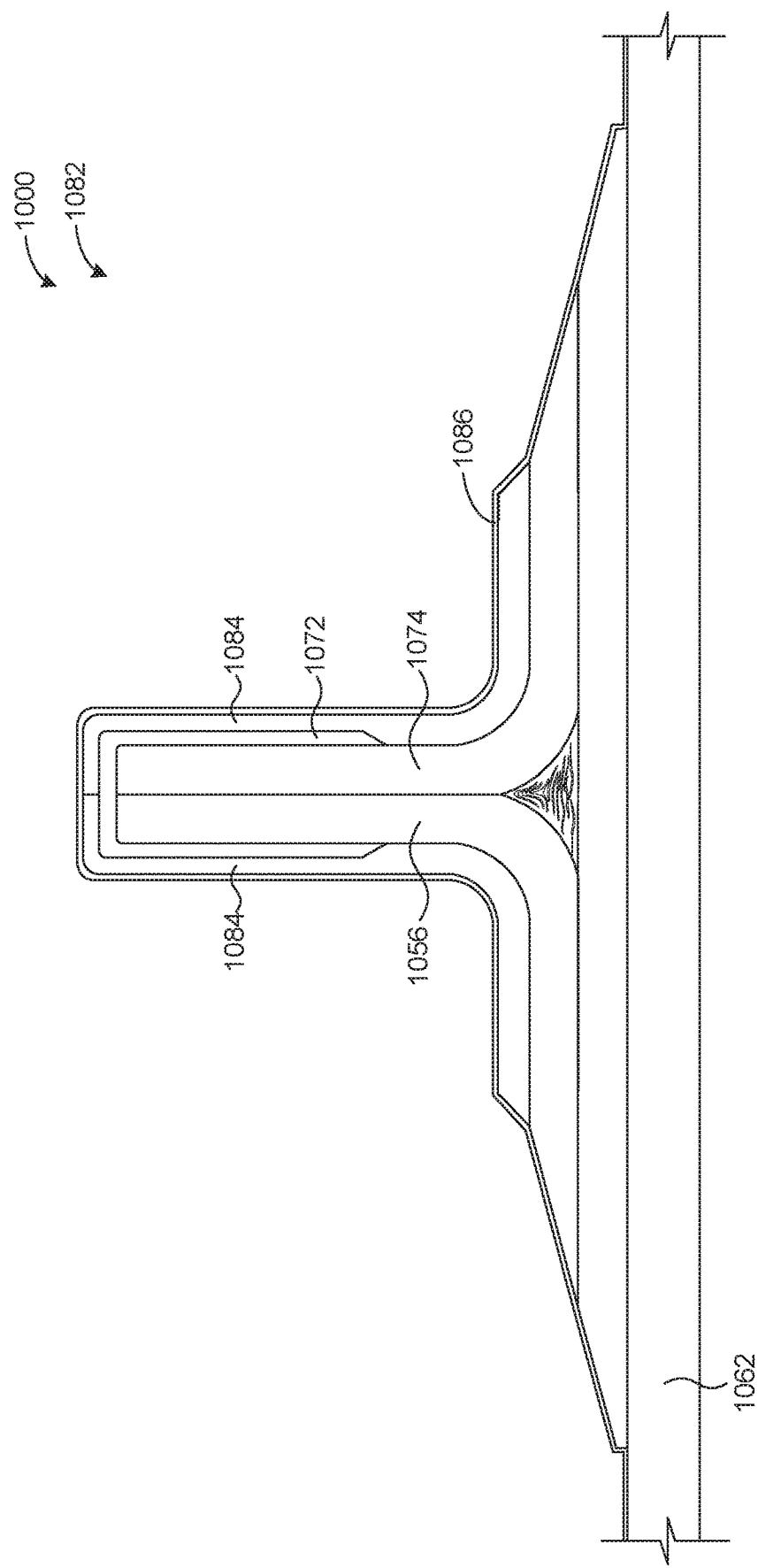

During an eleventh stage 1082 of the process shown in FIG. 10K, the formed structure 1056, the base segment pre-layup 1060, and the third composite blank 1072 are compacted relative to one another and/or relative to the skin 1062. One or more caul(s) 1084 can be placed on and/or around the formed structure 1056, the skin 1062, and/or the third composite blank 1072 to assist in the compacting process. A vacuum bag 1086 can be placed on and/or around the formed structure 1056, the skin 1062, the third composite blank 1072, and/or the caul(s) 1084 to assist in the compacting process. The compacting process can include applying vacuum force to the formed structure 1056, the skin 1062, the third composite blank 1072, and/or the caul(s) 1084 via the vacuum bag 1086. The caul(s) 1084 and the vacuum bag 1086 can be removed following the compacting process. The eleventh stage 1082 of the process 1000 shown in FIG. 10K further includes curing the formed structure 1056, the skin 1062, and/or the third composite blank 1072.

The above-described process 1000 of FIGS. 10A-10K can be used to manufacture the stringer 300 of FIG. 3. For example, the first stiffening segment 1020 of the process 1000 of FIGS. 10A-10K corresponds to the first stiffening segment 304 of FIG. 3, with the first, second and third portions 1026, 1028, 1030 of the first stiffening segment 1020 of the process 1000 of FIGS. 10A-10K corresponding to the first, second and third portions 326, 328, 330 of the first stiffening segment 304 of FIG. 3. The second stiffening segment 1022 of the process 1000 of FIGS. 10A-10K corresponds to the second stiffening segment 306 of FIG. 3, with the first, second and third portions 1032, 1034, 1036 of the second stiffening segment 1022 of the process 1000 of FIGS. 10A-10K corresponding to the first, second and third portions 348, 350, 352 of the second stiffening segment 306 of FIG. 3. The filler area 1040 of the process 1000 of FIGS. 10A-10K corresponds to the filler area 310 of FIG. 3. The filler 1044 of the process 1000 of FIGS. 10A-10K corresponds to the filler 312 of FIG. 3. The second composite blank 1048 of the process 1000 of FIGS. 10A-10K, in combination with the base segment pre-layup 1060 of the process 1000 of FIGS. 10A-10K, corresponds to the base segment 308 of FIG. 3, with the first, second and third portions 1050, 1052, 1054 of the second composite blank 1048 of the process 1000 of FIGS. 10A-10K corresponding to the first, second and third portions 370, 372, 374 of the base segment 308 of FIG. 3. The skin 1062 of the process 1000 of FIGS. 10A-10K corresponds to the skin 302 of FIG. 3. The third composite blank 1072 of the process 1000 of FIGS. 10A-10K corresponds to the reinforcement segment 314 of FIG. 3.

From the foregoing, it will be appreciated that the stringers disclosed above (e.g., stringers having CFRP material reinforced flanges) provide numerous advantages over known stringers. For example, the above-described structural differences between the stringer of FIG. 3 and the known stringer of FIG. 2 result in the stringer of FIG. 3 having a reduced material volume, a reduced weight, and/or a reduced production cost relative to the material volume, the weight, and/or the production cost of the known stringer of FIG. 2. As another example, the above-described reduced cross-sectional area of the filler area of the stringer of FIG. 3 relative to the cross-sectional area of the known stringer of FIG. 2 reduces (e.g., minimizes and/or prevents) thermal cracking and/or the formation of wrinkles within the stringer. Such a reduction in thermal cracking and/or in the formation of wrinkles results in an increase in the performance characteristic(s) (e.g., impact strength, crippling strength, buckling strength, etc.) of the stringer of FIG. 3 relative to the known stringer of FIG. 2. Furthermore, as discussed above, the multi-ply structure of the CFRP reinforcement segment of the stringer of FIG. 3 independently increases the impact strength of the flange of the stringer of FIG. 3 relative to the impact strength associated with the flange of the known stringer of FIG. 2.

A stringer to be coupled to a skin of an aircraft is disclosed. The stringer comprises a flange. The flange includes a first portion of a first stiffening segment. The flange also includes a first portion of a second stiffening segment coupled to the first portion of the first stiffening segment. The flange also includes a CFRP reinforcement segment coupled to the first portion of the first stiffening segment and to the first portion of the second stiffening segment. The CFRP reinforcement segment is to strengthen the first portion of the first stiffening segment and the first portion of the second stiffening segment.

The CFRP reinforcement segment includes multiple plies of CFRP tape or CFRP fabric. The multiple plies of the CFRP reinforcement segment can be configured as a non-traditional layup. The non-traditional layup can be a symmetric layup.

The CFRP reinforcement segment is to increase at least one of an impact strength, a crippling strength, or a buckling strength of the first portion of the first stiffening segment and the first portion of the second stiffening segment.

The first stiffening segment further includes a first surface and a second surface located opposite the first surface of the first stiffening segment. The second stiffening segment further includes a first surface and a second surface located opposite the first surface of the second stiffening segment. The CFRP reinforcement segment includes a first surface and a second surface located opposite the first surface of the first stiffening segment. The second surface of the first stiffening segment along the first portion of the first stiffening segment is coupled to the second surface of the second stiffening segment along the first portion of the second stiffening segment. The second surface of the CFRP reinforcement segment is coupled to the first surface of the first stiffening segment along the first portion of the first stiffening segment and is further coupled to the first surface of the second stiffening segment along the first portion of the second stiffening segment.

The first stiffening segment further includes a second portion oriented orthogonally to the first portion of the first stiffening segment, and a third portion extending between the first and second portions of the first stiffening segment. The second stiffening segment further includes a second portion oriented orthogonally to the first portion of the second stiffening segment, and a third portion extending between the first and second portions of the second stiffening segment.

The CFRP reinforcement segment extends along between thirty five percent and eighty five percent of a height dimension of the stringer measured orthogonally from an end of the first portion of the first stiffening segment to a portion of the first surface of the first stiffening segment located at the second portion of the first stiffening segment.

The stringer further comprises a base segment, a filler area, and a filler. The base segment includes a first portion, a second portion located opposite the first portion of the base segment, and a third portion extending between the first and second portions of the base segment. The first portion of the base segment is coupled to the second portion of the first stiffening segment. The second portion of the base segment is coupled to the second portion of the second stiffening segment. The filler area is defined by the third portion of the first stiffening segment, the third portion of the second stiffening segment, and the third portion of the base segment. The filler is retained within the filler area.

The first stiffening segment has a first thickness, the second stiffening segment has a second thickness equal to the first thickness, the base segment has a third thickness equal to the first thickness and equal to the second thickness, and the CFRP reinforcement segment has a fourth thickness.

The flange comprises a first flange. The stringer further comprises a second flange and a third flange. The second flange and the third flange are oriented orthogonally to the first flange. The second flange includes the second portion of the first stiffening segment and the first portion of the base segment. The third flange includes the second portion of the second stiffening segment and the second portion of the base segment. The first flange has a fifth thickness equal to a sum of the first thickness, the second thickness, and twice the fourth thickness. The second flange has a sixth thickness equal to a sum of the first thickness and the third thickness. The third flange has a seventh thickness equal to a sum of the second thickness and the third thickness. The fifth thickness is greater than the sixth thickness and greater than the seventh thickness.

A method of manufacturing a stringer for an aircraft is disclosed. The method comprises forming first and second stiffening segments from a first composite blank. The method further comprises coupling a first portion of the first stiffening segment to a first portion of the second stiffening segment. The method further comprises forming a CFRP reinforcement segment from a second composite blank. The method further comprises coupling the CFRP reinforcement segment to the first portion of the first stiffening segment and to the first portion of the second stiffening segment. The CFRP reinforcement segment is to strengthen the first portion of the first stiffening segment and the first portion of the second stiffening segment.

The first composite blank has a chordwise ply drop ratio between three and thirty and a spanwise ply drop ratio between one hundred twenty and three hundred. The second composite blank has a chordwise ply drop ratio between three and thirty and a spanwise ply drop ratio between one hundred and three hundred. The CFRP reinforcement segment includes multiple plies of CFRP tape or CFRP fabric. The multiple plies of the CFRP reinforcement segment can be configured as a non-traditional layup. The non-traditional layup can be a symmetric layup.

The first stiffening segment further includes a first surface and a second surface located opposite the first surface of the first stiffening segment. The second stiffening segment further includes a first surface and a second surface located opposite the first surface of the second stiffening segment. The CFRP reinforcement segment includes a first surface and a second surface located opposite the first surface of the first stiffening segment. The second surface of the first stiffening segment along the first portion of the first stiffening segment is coupled to the second surface of the second stiffening segment along the first portion of the second stiffening segment. The second surface of the CFRP reinforcement segment is coupled to the first surface of the first stiffening segment along the first portion of the first stiffening segment and is further coupled to the first surface of the second stiffening segment along the first portion of the second stiffening segment.

The first stiffening segment further includes a second portion oriented orthogonally to the first portion of the first stiffening segment, and a third portion extending between the first and second portions of the first stiffening segment. The second stiffening segment further includes a second portion oriented orthogonally to the first portion of the second stiffening segment, and a third portion extending between the first and second portions of the second stiffening segment.

The CFRP reinforcement segment extends along between thirty five percent and eighty five percent of a height dimension of the stringer measured orthogonally from an end of the first portion of the first stiffening segment to a portion of the first surface of the first stiffening segment located at the second portion of the first stiffening segment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A stringer to be coupled to a skin of an aircraft, the stringer comprising:
a flange including a first portion of a first stiffening segment, a first portion of a second stiffening segment coupled to the first portion of the first stiffening segment, and a carbon fiber reinforced plastic (CFRP) reinforcement segment coupled to the first portion of the first stiffening segment and to the first portion of the second stiffening segment, the CFRP reinforcement segment including at least four plies of CFRP material that are stacked in face-to-face contact relative to one another, the at least four plies of CFRP material forming an interior surface and an exterior surface of the CFRP reinforcement segment, the interior surface facing toward and coupled to the first portion of the first stiffening segment and the first portion of the second stiffening segment, the exterior surface facing away from the first portion of the first stiffening segment and the first portion of the second stiffening segment, the CFRP reinforcement segment configured to strengthen the first portion of the first stiffening segment and the first portion of the second stiffening segment.

2. The stringer of claim 1, wherein the CFRP material is CFRP tape or CFRP fabric.

3. The stringer of claim 2, wherein the at least four plies of CFRP material are configured as a non-traditional layup.

4. The stringer of claim 3, wherein the non-traditional layup is a symmetric layup.

5. The stringer of claim 1, wherein the CFRP reinforcement segment is configured to increase at least one of an impact strength, a crippling strength, or a buckling strength of the first portion of the first stiffening segment and the first portion of the second stiffening segment.

6. The stringer of claim 1, wherein the first stiffening segment further includes a first surface and a second surface located opposite the first surface of the first stiffening segment, wherein the second stiffening segment further includes a first surface and a second surface located opposite the first surface of the second stiffening segment, wherein the second surface of the first stiffening segment along the first portion of the first stiffening segment is coupled to the second surface of the second stiffening segment along the first portion of the second stiffening segment, and wherein the interior surface of the at least four plies of CFRP material of the CFRP reinforcement segment is coupled to the first surface of the first stiffening segment along the first portion of the first stiffening segment and is further coupled to the first surface of the second stiffening segment along the first portion of the second stiffening segment.

7. The stringer of claim 6, wherein the first stiffening segment further includes a second portion oriented orthogonally to the first portion of the first stiffening segment, and a third portion extending between the first and second portions of the first stiffening segment, and wherein the second stiffening segment further includes a second portion oriented orthogonally to the first portion of the second stiffening segment, and a third portion extending between the first and second portions of the second stiffening segment.

8. The stringer of claim 7, wherein the CFRP reinforcement segment extends along between thirty-five percent and eighty-five percent of a height dimension of the stringer measured orthogonally from an end of the first portion of the first stiffening segment to a portion of the first surface of the first stiffening segment located at the second portion of the first stiffening segment.

9. The stringer of claim 7, further comprising a base segment, a filler area, and a filler, the base segment including a first portion, a second portion located opposite the first portion of the base segment, and a third portion extending between the first and second portions of the base segment, the first portion of the base segment being coupled to the second portion of the first stiffening segment, the second portion of the base segment being coupled to the second portion of the second stiffening segment, the filler area being defined by the third portion of the first stiffening segment, the third portion of the second stiffening segment, and the third portion of the base segment, the filler being retained within the filler area.

10. The stringer of claim 9, wherein the first stiffening segment has a first thickness, the second stiffening segment has a second thickness equal to the first thickness, the base segment has a third thickness equal to the first thickness and equal to the second thickness, and the CFRP reinforcement segment has a fourth thickness.

11. The stringer of claim 10, wherein the flange is a first flange, the stringer further comprising a second flange and a third flange, the second flange and the third flange being oriented orthogonally to the first flange, the second flange including the second portion of the first stiffening segment and the first portion of the base segment, the third flange including the second portion of the second stiffening segment and the second portion of the base segment, the first flange having a fifth thickness equal to a sum of the first thickness, the second thickness, and twice the fourth thickness, the second flange having a sixth thickness equal to a sum of the first thickness and the third thickness, the third flange having a seventh thickness equal to a sum of the second thickness and the third thickness, the fifth thickness being greater than the sixth thickness and greater than the seventh thickness.

12. A method of manufacturing a stringer for an aircraft, the method comprising:
    forming first and second stiffening segments from a first composite blank;
    coupling a first portion of the first stiffening segment to a first portion of the second stiffening segment;
    forming a carbon fiber reinforced plastic (CFRP) reinforcement segment from a second composite blank, the CFRP reinforcement segment including at least four plies of CFRP material that are stacked in face-to-face contact relative to one another, the at least four plies of CFRP material forming an interior surface and an exterior surface of the CFRP reinforcement segment, the interior surface configured to face toward the first portion of the first stiffening segment and the first portion of the second stiffening segment, the exterior surface configured to face away from the first portion of the first stiffening segment and the first portion of the second stiffening segment; and
    coupling the interior surface of the at least four plies of CFRP material of the CFRP reinforcement segment to the first portion of the first stiffening segment and to the first portion of the second stiffening segment, the CFRP reinforcement segment to strengthen the first portion of the first stiffening segment and the first portion of the second stiffening segment.

13. The method of claim 12, wherein the first composite blank has a chordwise ply drop ratio between three and thirty and a spanwise ply drop ratio between one hundred twenty and three hundred.

14. The method of claim 12, wherein the second composite blank has a chordwise ply drop ratio between three and thirty and a spanwise ply drop ratio between one hundred and three hundred.

15. The method of claim 12, wherein the CFRP material is CFRP tape or CFRP fabric.

16. The method of claim 15, wherein the at least four plies of CFRP material are configured as a non-traditional layup.

17. The method of claim 16, wherein the non-traditional layup is a symmetric layup.

18. The method of claim 12, wherein the first stiffening segment further includes a first surface and a second surface located opposite the first surface of the first stiffening segment, wherein the second stiffening segment further includes a first surface and a second surface located opposite the first surface of the second stiffening segment, wherein the second surface of the first stiffening segment along the first portion of the first stiffening segment is coupled to the second surface of the second stiffening segment along the first portion of the second stiffening segment, and wherein the interior surface of the at least four plies of CFRP material of the CFRP reinforcement segment is coupled to the first surface of the first stiffening segment along the first portion of the first stiffening segment and is further coupled to the first surface of the second stiffening segment along the first portion of the second stiffening segment.

19. The method of claim 18, wherein the first stiffening segment further includes a second portion oriented orthogonally to the first portion of the first stiffening segment, and a third portion extending between the first and second portions of the first stiffening segment, and wherein the second stiffening segment further includes a second portion oriented orthogonally to the first portion of the second stiffening segment, and a third portion extending between the first and second portions of the second stiffening segment.

20. The method of claim 19, wherein the CFRP reinforcement segment extends along between thirty-five percent and eighty-five percent of a height dimension of the stringer measured orthogonally from an end of the first portion of the first stiffening segment to a portion of the first surface of the first stiffening segment located at the second portion of the first stiffening segment.

21. The stringer of claim 1, wherein each one of the at least four plies of CFRP material has a uniform thickness relative to other ones of the at least four plies of CFRP material, and wherein a combined thickness of the at least four plies of CFRP material is approximately two millimeters.

22. The stringer of claim 7, wherein the first portion of the first stiffening segment includes an end having a flat edge extending between the first surface and the second surface of the first stiffening segment, the first portion of the second stiffening segment includes an end having a flat edge extending between the first surface and the second surface of the second stiffening segment, the second portion of the first stiffening segment includes an end having a chamfered edge extending between the first surface and the second surface of the first stiffening segment, and the second portion of the second stiffening segment includes an end having a chamfered edge extending between the first surface and the second surface of the second stiffening segment.

23. The stringer of claim 1, wherein the CFRP reinforcement segment includes a first chamfered edge extending between the exterior surface and the interior surface along the first portion of the first stiffening segment, and a second chamfered edge extending between the exterior surface and the interior surface along the first portion of the second stiffening segment.

\* \* \* \* \*